United States Patent
Zahniser et al.

(10) Patent No.: US 11,933,711 B2
(45) Date of Patent: Mar. 19, 2024

(54) SYSTEMS AND METHODS FOR SAMPLE DISPLAY AND REVIEW

(71) Applicant: Roche Diagnostics Hematology, Inc., Indianapolis, IN (US)

(72) Inventors: David Zahniser, Wellesley, MA (US); Michael Zahniser, Jamaica Plain, MA (US); Adam Yie, Wellesley, MA (US)

(73) Assignee: Roche Diagnostics Hematology, Inc., Indianapolis, IN (US)

( * ) Notice: Subject to any disclaimer, the term of this patent is extended or adjusted under 35 U.S.C. 154(b) by 0 days.

(21) Appl. No.: 17/075,631

(22) Filed: Oct. 20, 2020

(65) Prior Publication Data

US 2021/0239595 A1 Aug. 5, 2021

Related U.S. Application Data

(63) Continuation of application No. 13/526,223, filed on Jun. 18, 2012, now Pat. No. 11,047,791.

(Continued)

(51) Int. Cl.
*G01N 15/14* (2006.01)
*G06T 7/00* (2017.01)
(Continued)

(52) U.S. Cl.
CPC ....... *G01N 15/1475* (2013.01); *G06T 7/0012* (2013.01); *G06T 7/136* (2017.01);
(Continued)

(58) Field of Classification Search
CPC ........... G01N 15/1475; G01N 15/1429; G01N 2015/0073; G01N 2015/1465;
(Continued)

(56) References Cited

U.S. PATENT DOCUMENTS 5,123,055 A 6/1992 Kasdan
5,287,272 A 2/1994 Rutenberg et al.
(Continued)

FOREIGN PATENT DOCUMENTS

CN 101490529 A 7/2009
CN 101762584 6/2010
(Continued)

OTHER PUBLICATIONS

Bacus et al., "An Automated Method of Differential Red Blood Cell Classification with Application to the Diagnosis of Anemia," J Histochem. Cytochem., 1977, 25(7):614-632.
(Continued)

*Primary Examiner* — Joseph W Becker
(74) *Attorney, Agent, or Firm* — Fish & Richardson P.C.

(57) ABSTRACT

Methods and systems for displaying images of cells in a sample include obtaining a plurality of images of cells in the sample, where each image corresponds to one of the cells in the sample, determining values of at least one property for each of the cells based on the plurality of images, arranging the plurality of images to form a first image array, where the images are ordered in the first image array based on the values of the at least one property, displaying the first image array, sorting the plurality of images to form a second image array in which an ordering of the images is different from the first image array, and displaying the second image array, where the sample includes blood and the cells include red blood cells.

18 Claims, 20 Drawing Sheets

Related U.S. Application Data

(60) Provisional application No. 61/510,710, filed on Jul. 22, 2011, provisional application No. 61/510,696, filed on Jul. 22, 2011, provisional application No. 61/510,614, filed on Jul. 22, 2011, provisional application No. 61/498,456, filed on Jun. 17, 2011.

(51) Int. Cl.
  *G06T 7/136* (2017.01)
  *G01N 15/00* (2006.01)
  *G01N 35/00* (2006.01)

(52) U.S. Cl.
  CPC . *G01N 2015/0073* (2013.01); *G01N 15/1429* (2013.01); *G01N 2015/1465* (2013.01); *G01N 2015/1472* (2013.01); *G01N 2035/0091* (2013.01); *G06T 2207/10056* (2013.01); *G06T 2207/30024* (2013.01)

(58) Field of Classification Search
  CPC .... G01N 2015/1472; G01N 2035/0091; G06T 7/0012; G06T 7/136; G06T 2207/10056; G06T 2207/30024
  See application file for complete search history.

(56) References Cited

U.S. PATENT DOCUMENTS

| | | | |
|---|---|---|---|
| 5,333,207 A | 7/1994 | Rutenberg | |
| 5,544,650 A | 8/1996 | Boon et al. | |
| 5,625,705 A | 4/1997 | Recht | |
| 5,655,029 A | 8/1997 | Rutenberg et al. | |
| 5,675,760 A | 10/1997 | Houwen et al. | |
| 5,677,966 A | 10/1997 | Doerrer et al. | |
| 5,740,270 A | 4/1998 | Rutenberg et al. | |
| 5,889,880 A | 3/1999 | Doerrer et al. | |
| 5,939,278 A | 8/1999 | Boon et al. | |
| 6,091,842 A | 7/2000 | Domanik et al. | |
| 6,148,096 A | 11/2000 | Pressman et al. | |
| 6,235,536 B1 | 5/2001 | Warlaw et al. | |
| 6,522,781 B1 | 2/2003 | Norikane et al. | |
| 6,553,135 B1 | 4/2003 | Douglass et al. | |
| 6,718,053 B1 | 4/2004 | Ellis et al. | |
| 7,190,818 B2 | 3/2007 | Ellis et al. | |
| 7,368,080 B2 | 5/2008 | Tamura et al. | |
| 7,383,134 B2 | 6/2008 | Piper et al. | |
| 7,790,107 B2 | 9/2010 | Nakaya | |
| 7,925,070 B2 | 4/2011 | Sumida et al. | |
| 8,263,414 B2 | 9/2012 | Pugia et al. | |
| 2003/0161003 A1 | 8/2003 | Herbert | |
| 2006/0050948 A1 | 3/2006 | Sumida et al. | |
| 2006/0263902 A1 | 11/2006 | Pugia et al. | |
| 2007/0179715 A1 | 8/2007 | Ariyoshi | |
| 2007/0217949 A1 | 9/2007 | Mimura et al. | |
| 2008/0144945 A1* | 6/2008 | Merlet | G06T 7/0012 382/225 |
| 2009/0006003 A1 | 1/2009 | Hirayama et al. | |
| 2009/0191585 A1 | 7/2009 | Yamada et al. | |
| 2009/0198463 A1 | 8/2009 | Kamihara et al. | |
| 2009/0323062 A1 | 12/2009 | Ariyoshi et al. | |
| 2010/0023675 A1 | 1/2010 | Chen et al. | |
| 2010/0080440 A1 | 4/2010 | Yamada | |
| 2010/0138774 A1 | 6/2010 | Crosbie et al. | |
| 2010/0169811 A1 | 7/2010 | Yamada | |
| 2010/0183216 A1 | 7/2010 | Yamada | |
| 2010/0232675 A1 | 9/2010 | Ortyn et al. | |
| 2011/0070606 A1* | 3/2011 | Winkelman | G01N 1/312 435/39 |

FOREIGN PATENT DOCUMENTS

| | | |
|---|---|---|
| CN | 102053057 | 5/2011 |
| DE | 69429481 | 12/2001 |
| EP | 0 549 905 A1 | 7/1993 |
| EP | 0 693 679 A1 | 1/1996 |
| EP | 0 643 360 B1 | 12/2001 |
| EP | 1 387 171 | 2/2004 |
| EP | 1 804 046 | 7/2007 |
| EP | 1 998 179 A2 | 12/2008 |
| EP | 2 083 375 A1 | 7/2009 |
| EP | 2 202 506 | 6/2010 |
| GB | 8412671 | 6/1984 |
| JP | H08029317 | 2/1996 |
| JP | H11271209 A | 10/1999 |
| JP | 2000353246 | 12/2000 |
| JP | 2003/298995 | 10/2003 |
| JP | 3916395 | 5/2007 |
| JP | 2008064534 | 3/2008 |
| JP | 2009212626 | 9/2009 |
| JP | 2010/151647 | 7/2010 |
| WO | WO 9908091 B1 | 2/1999 |
| WO | WO 2009/0085534 | 7/2009 |
| WO | WO 2009/0135271 | 11/2009 |

OTHER PUBLICATIONS

Bacus et al., "Image Processing for Automated Erythrocyte Classification," J Histochem. Cytochem., 1976, 24(1):195-201.

Briggs et al., "Can Automated Blood Film Analysis Replace the Manual Differential? An Evaluation of the Cella Vision DM96 Automated Image Analysis System," Int'l J Laboratory Hematology, J Compilation, 2007, pp. 1-13.

Cambus et al., "A Data Management software for the Sysmex NE 8000 Haematology Analyser," Comput. Biol. Med., 1996, 26(4):355-359.

Cellavision DiffMaster™ Octavia Automated Digital Cell Morphology Brochure, 14 pages.

CN English translation of Chinese Office Action issued in corresponding CN Patent Application No. 201280040121.8 dated Mar. 24, 2016, 8 pages.

CN English translation of First Office Action issued in corresponding Chinese Application No. 201280040121.8 dated May 29, 2015, 38 pages.

CN English Translation of Search Report issued in corresponding Chinese Application No. dated on May 29, 2015, 4 pages.

De Cresce and Lifshitz, "PAPNET Cytological Screening System," Laboratory Medicine, 1991, 22(4):276-280.

EP European Office Action in European Application No. 12732906.8, dated May 24, 2019, 6 pages.

IP Australia Patent Examination Report No. 1, issued in corresponding Australian Patent Appl. No. 2015271917 dated Jul. 12, 2016, 3 pages.

JP English translation of Japanese Office Action issued in corresponding JP Patent Application No. 2014-416079 dated Mar. 29, 2016, 20 pages.

JP Japanese Office Action in Japanese Application No. 2017-043947, dated Mar. 13, 2018, 6 pages (with English Translation).

CN Office Action in Chinese Appln. No. 201810145754.4, dated Oct. 27, 2020, 7 pages (with English translation).

CN Search Report in Chinese Appln. No. 201810145754.4, dated Oct. 27, 2020, 5 pages (with English translation).

JP Office Action in Japanese Appln. No. 2019-076632, dated Feb. 25, 2020, 6 pages (with English translation).

JP Office Action in Japanese Appln. No. 2019-076632, dated Nov. 17, 2020, 9 pages (with English translation).

PCT International Preliminary Report on Patentability in International Search Report in Application No. PCT/US2012/042972, dated Dec. 17, 2013, 13 pages.

PCT International Search Report and Written Opinion by Examiner Gunnar Eidmann, dated Oct. 22, 2012, in international application No. PCT/US2012/046785, 14 pges.

PCT International Search Report and Written Opinion dated Jan. 3, 2013 issued in international application No. PCT/US2012/042972, 19 pgs.

PCT Invitation to Pay Additional Fees issued in PCT application No. PCT/US2012/042972, 12 pgs.

(56) References Cited

OTHER PUBLICATIONS

Sheridan et al., "Productivity Improvements after Implementation of the Cella Vision™ DM96 Image Analysis System," Int'l J Laboratory Hematology, J Compilation, 2008, 30(Suppl. 1):146.
Trimintzios et al., A Management and Control Architecture for Providing IP Differentiated Services in MPLS-Based Networks, IEEE Communications Magazine (2001).

* cited by examiner

SYSTEMS AND METHODS FOR SAMPLE DISPLAY AND REVIEW

CROSS-REFERENCE TO RELATED APPLICATIONS

This application is a continuation of U.S. patent application Ser. No. 13/526,223, filed Jun. 18, 2012, which claims priority under 35 U.S.C. § 119(e) to the following U.S. Provisional Patent Applications: 61/498,456, filed on Jun. 17, 2011; 61/510,614, filed on Jul. 22, 2011; 61/510,696, filed on Jul. 22, 2011; and 61/510,710, filed on Jul. 22, 2011. The entire contents of each of the foregoing applications are incorporated by reference herein.

TECHNICAL FIELD

This disclosure relates to organizing and presenting information, including displaying sample images.

BACKGROUND

The process of analyzing blood samples is complicated by the detection of abnormalities associated with individual samples. When such abnormalities are detected in a particular sample, the sample is typically forwarded for manual review by a trained technician. The technician prepares a suitable smear from the sample and attempts, through ad-hoc visual inspection of cells under a microscope, to determine the nature and extent of abnormalities present, and in some cases, to diagnose a patient's condition based on the observations.

SUMMARY

Conventional methods for assessing the cellular constituents of blood samples are qualitative and subject to interpretive errors and subjective biases of the human technicians that examine the samples. Typically, blood samples undergo an initial inspection to determine whether the cells of a particular sample exhibit any abnormalities. If such abnormalities are detected in a sample, the sample is flagged for further inspection. During the subsequent inspection, a technician examines a series of cells in the sample under a microscope in random order, taking note of various features of the observed cells. The technician then makes subjective judgments regarding the level of various abnormalities in the sample. These subjective judgments can lead to further analysis of the sample, diagnoses based on the observed abnormalities, or assignment of the sample as "normal" (and thus flagged in error).

Unfortunately, conventional sample inspection methods are typically performed in an ad-hoc manner, in which various individual cells within a sample are selected and viewed at random by a technician, making systematic comparative assessment of multiple cells within a sample a difficult task. This disclosure features methods and systems for displaying information derived from multiple cells in a blood sample in an organized, systematic manner to enable a technician to rapidly and accurately assess the variability of several cell properties within a blood sample. In particular, the methods and systems disclosed herein permit user-selectable sorting of large numbers of images of individual cells within a single sample. The cellular images can be sorted by criteria such as size, darkness, roundness, and membrane smoothness. Each of these parameters can be quantitatively determined for the individual cells. By sorting the cell images according to these criteria, the technician's task of making judgments regarding levels of abnormality in a blood sample can be greatly simplified, and the effects of human subjectivity and biases can be reduced.

In general, in a first aspect, the disclosure features a method of displaying images of cells in a sample that includes: (a) obtaining a plurality of images of cells in the sample, where each image corresponds to one of the cells in the sample; (b) determining values of at least one property for each of the cells based on the plurality of images; (c) arranging the plurality of images to form a first image array, where the images are ordered in the first image array based on the values of the at least one property; (d) displaying the first image array; (e) sorting the plurality of images to form a second image array in which an ordering of the images is different from the first image array; and (f) displaying the second image array, where the sample includes blood and the cells include red blood cells.

Embodiments of the method can include any one or more of the following features.

Each image in the first image array can be displayed as a user-selectable control. Each user-selectable control can be configured so that, when activated, information about the corresponding cell in the sample is displayed.

The values of the at least one property can include a cell hemoglobin content of each of the cells. The values of the at least one property can include a cell volume of each of the cells. The values of the at least one property can include a cell size of each of the cells. The values of the at least one property can include an optical density of each of the cells. The values of the at least one property can include a shape of each of the cells.

The method can include determining values of a second property for each of the cells based on the plurality of images, and sorting the plurality of images to form the second image array based on the values of the second property. The values of the second property can include a cell hemoglobin content of each of the cells. The values of the second property can include a cell volume of each of the cells. The values of the second property can include a cell size of each of the cells. The values of the second property can include an optical density of each of the cells. The values of the second property can include a shape of each of the cells.

The method can include detecting a disease condition in a patient based on at least one of the first image array and the second image array.

The method can include analyzing the plurality of images to identify inclusions in the cells, wherein the second property is a property related to the inclusions. The property related to the inclusions can include at least one of a size of the inclusions, a shape of the inclusions, and a number of the inclusions.

The method can include activating a control on a display device on which the second image array is displayed to provide an assessment of the sample based on the second image array.

The method can include: for each of the plurality of images, identifying a set of pixels associated with the cell corresponding to the image; determining a reference location for each of the cells based on the set of pixels; and arranging the plurality of images in the first image array so that the reference location for each cell in the first image array is equally spaced from the reference locations for adjacent cells in the first image array.

The method can include, for each of the plurality of images, identifying a background set of pixels in the image that does not correspond to the cell associated with the image, where displaying the first image array includes, for each of the plurality of images, assigning a color to each member of the background set of pixels, and where the color is assigned based on the value of the at least one property for the cell associated with the image.

The method can include displaying the first image array and a plurality of user-selectable controls on a display device, where each of the user-selectable controls corresponds to a different property of the cells, and sorting the plurality of images to form the second image array when one of the plurality of user-selectable controls is activated, where the second property is the property that corresponds to the activated control.

Embodiments of the method can also include any of the other steps and features disclosed herein, in any combination, as appropriate.

In another aspect, the disclosure features a system for visual inspection of red blood cells, the system including: (a) a light source configured to illuminate red blood cells in a sample; (b) a detector configured to obtain a plurality of images of the red blood cells, where each image corresponds to a different one of the red blood cells in the sample; (c) a display device configured to display images of the red blood cells; and (d) an electronic processor configured to: (i) determine values of at least one property for each of the cells based on the plurality of images; (ii) arrange the plurality of images to form a first image array, where the images are ordered in the first image array based on the values of the at least one property; (iii) display the first image array on the display device; (iv) sort the plurality of images to form a second image array in which an ordering of the images is different from the first image array; and (v) display the second image array on the display device.

Embodiments of the system can include any one or more of the following features.

The display device can be configured to display each image in the first image array as a user-selectable control. The electronic processor can be configured so that when one of the user-selectable controls is activated, the electronic processor displays information about the cell corresponding to the activated control on the display device.

The values of the at least one property can include a cell hemoglobin content of each of the cells. The values of the at least one property can include a cell volume of each of the cells. The values of the at least one property can include at least one member from the group consisting of a cell size of each of the cells, an optical density of each of the cells, and a shape of each of the cells.

The electronic processor can be configured to determine values of a second property for each of the cells based on the plurality of images, and sort the plurality of images to form the second image array based on the values of the second property. The electronic processor can be configured to display a plurality of user-selectable controls on the display device, where each of the user-selectable controls corresponds to a different property of the cells, and sort the plurality of images to form the second image array when one of the plurality of user-selectable controls is activated, where the second property is the property that corresponds to the activated control.

The electronic processor can be configured to analyze the plurality of images to identify inclusions in the cells, where the second property is a property related to the inclusions and includes at least one of a size of the inclusions, a shape of the inclusions, and a number of the inclusions.

The electronic processor can be configured to: for each of the plurality of images, identify a set of pixels associated with the cell corresponding to the image; determine a reference location for each of the cells based on the set of pixels; and display the plurality of images in the first image array on the display device so that the reference location for each cell in the first image array is equally spaced from the reference locations for adjacent cells in the first image array.

For each of the plurality of images, the electronic processor can be configured to identify a background set of pixels in the image that does not correspond to the cell associated with the image, and display the image in the first image array by assigning a color to each member of the background set of pixels, where the color is assigned based on the value of the at least one property for the cell associated with the image.

Embodiments of the system can include any of the other steps or features disclosed herein, in any combination, as appropriate.

In a further aspect, the disclosure features a computer readable storage device, having encoded thereon computer readable instructions that, when executed by a processor, cause the processor to: (a) obtain a plurality of images of cells in a sample, where each image corresponds to a different one of the cells in the sample; (b) determine values of at least one property for each of the cells based on the plurality of images; (c) arrange the plurality of images to form a first image array, where the images are ordered in the first image array based on the values of the at least one property; and (d) display the first image array, where the sample includes blood and the cells comprise red blood cells.

Embodiments of the storage device can include any one or more of the steps or features disclosed herein, in any combination, as appropriate.

In another aspect, the disclosure features a method of displaying images of cells in a sample that includes: (a) obtaining a plurality of images of cells in the sample, where each image corresponds to one of the cells in the sample; (b) determining values of at least one property for each of the cells based on the plurality of images; (c) arranging the plurality of images at random to form a first image array; (d) displaying the first image array; (e) arranging the plurality of images to form a second image array, where the images are ordered in the second image array based on the values of the at least one property; and (f) displaying the second image array.

Embodiments of the method can include any one or more of the following features.

The sample can include blood and the cells can include red blood cells. The sample can include blood and the cells can include platelets.

Each image in the second image array can be displayed as a user-selectable control. Each user-selectable control can be configured so that, when activated, information about the corresponding cell in the sample is displayed.

The values of the at least one property can include a cell hemoglobin content of each of the cells. The values of the at least one property can include a cell volume of each of the cells. The values of the at least one property can include a cell size of each of the cells. The values of the at least one property can include an optical density of each of the cells. The values of the at least one property can include a shape of each of the cells.

The method can include, for each of the plurality of images, identifying a background set of pixels in the image that does not correspond to the cell associated with the image, where displaying the second image array includes, for each of the plurality of images, assigning a color to each member of the background set of pixels, and where the color is assigned based on the value of the at least one property for the cell associated with the image.

Embodiments of the method can also include any of the other steps or features disclosed herein, in any combination, as appropriate.

In a further aspect, the disclosure features a system for visual inspection of cells that includes: (a) a light source configured to illuminate cells in a sample; (b) a detector configured to obtain a plurality of images of the cells, where each image corresponds to one of the cells in the sample; (c) a display device configured to display images of the cells; and (d) an electronic processor configured to: (i) determine values of at least one property for each of the cells based on the plurality of images; (ii) arrange the plurality of images at random to form a first image array; (iii) display the first image array; (iv) arrange the plurality of images to form a second image array, where the images are ordered in the second image array based on the values of the at least one property; and (v) display the second image array on the display device.

Embodiments of the system can include any one or more of the following features.

The display device can be configured to display each image in the second image array as a user-selectable control. The electronic processor can be configured so that when one of the user-selectable controls is activated, the electronic processor displays information about the cell corresponding to the activated control on the display device.

The values of the at least one property can include a cell hemoglobin content of each of the cells. The values of the at least one property can include a cell volume of each of the cells. The values of the at least one property can include at least one member from the group consisting of a cell size of each of the cells, an optical density of each of the cells, and a shape of each of the cells.

The electronic processor can be configured to analyze the plurality of images to identify inclusions in the cells, where the at least one property is a property related to the inclusions and includes at least one of a size of the inclusions, a shape of the inclusions, and a number of the inclusions.

For each of the plurality of images, the electronic processor can be configured to identify a background set of pixels in the image that does not correspond to the cell associated with the image, and display the image in the second image array by assigning a color to each member of the background set of pixels, where the color is assigned based on the value of the at least one property for the cell associated with the image.

Embodiments of the system can also include any of the other steps or features disclosed herein, in any combination, as appropriate.

In another aspect, the disclosure features a method of displaying images of cells in a sample, the method including: (a) obtaining a plurality of images of cells in the sample, where each image corresponds to a different one of the cells in the sample; (b) arranging the plurality of images to form an image array, where the images are ordered in the array according to at least one property for each of the cells derived from the plurality of images; and (c) displaying the ordered array of cell images on a user interface, where each cell image is displayed as a user-selectable control and is configured so that when it is activated by a user, information about the corresponding cell in the sample is displayed to the user.

Embodiments of the method can include any one or more of the following features.

The sample can include blood and the cells can include red blood cells. Each image can include a single cell in the sample. The at least one property can include a size of the cells. The method can include determining the size of the cells by calculating an area or a volume of each of the cells. The method can include determining the size of the cells by calculating a maximum dimension of each of the cells.

The at least one property can include an optical density of the cells. The method can include determining the optical density of the cells by calculating a sum of optical densities of each member of a set of pixels that corresponds to each of the cells. The method can include determining the optical density of the cells by calculating a mean optical density for each cell based on a set of pixels that correspond to the cell.

The at least one property can include a shape of the cells. The method can include determining the shape of the cells by calculating, for each of the cells, an area and a perimeter, and by determining a value of a ratio of a square of the perimeter to the area.

The at least one property can include a smoothness of a perimeter of each of the cells. The method can include determining the smoothness of the perimeter of each cell by constructing a convex hull for each cell based on a set of boundary pixels associated with the cell.

The method can include setting a threshold value of the at least one property, and displaying a fraction of the cells for which a value of the property is less than or greater than the threshold value.

The at least one property can include information about inclusions within the cells. The information about inclusions in the cells can include information about at least one of a size and a shape of inclusions within the cells.

The method can include identifying background regions associated with each of the cell images, and applying a color to each of the background regions, where the color applied to the background region of each cell image corresponds to the value of the at least one property for the cell in relation to maximum and minimum values of the at least one property among all cells in the array.

The ordered array can include a two-dimensional rectangular arrangement of cell images. The ordered array can include a radial arrangement of cell images, where a displacement of each cell image from a center of the radial arrangement is proportional to a difference between a mean value of the at least one property among all cells in the array and a value of the at least one property for the cell corresponding to the image.

Embodiments of the method can also include any of the other features disclosed herein, alone or with any of the preceding features, in any combination, as appropriate.

In another aspect, the disclosure features a system for visual inspection of red blood cells that includes: (a) a detector configured to obtain a plurality of images of red blood cells in a blood sample, where each image corresponds to a different one of the cells in the sample; (b) an electronic processor configured to determine a value of at least one property for each of the red blood cells from the plurality of images, and arrange the plurality of images to form an image array, where the images are ordered in the array according to the value of the at least one property; and (c) an interface configured to display the ordered array of cell images as user-selectable controls, where the interface is configured so that when a cell image control is activated by a user, the interface displays information about the corresponding cell in the sample.

Embodiments of the system can include one or more of the following features.

The interface can include a control configured to select the at least one property according to which the images in the array are ordered. The at least one property can include a size or a volume of the cells, an optical density of the cells, a shape of the cells, and/or a smoothness of a perimeter of each of the cells.

The interface can include a control configured to select a threshold value of the at least one property. The at least one property can include information about inclusions within the cells, the information including at least one of a size and a shape of inclusions within the cells.

The interface can be configured to display the ordered array as a two-dimensional rectangular arrangement of cell images. The interface can be configured to display the ordered array as a radial arrangement of cell images, where a displacement of each cell image from a center of the radial arrangement is proportional to a difference between a mean value of the at least one property among all cells in the array and a value of the at least one property for the cell corresponding to the image.

Embodiments of the system can also include any of the other features disclosed herein, alone or with any of the preceding features, in any combination, as appropriate.

In a further aspect, the disclosure features a method of assessing a blood sample, the method including: (a) obtaining a plurality of images of the sample, where each of the images corresponds to a single red blood cell in the sample; (b) calculating a property for each red blood cell based on the image of that cell; (c) arranging the plurality of images to form an image array, and displaying the array on a display device; activating a first control on the display device to re-order the images in the array, where the images are re-ordered based on the calculated property; and (d) activating a second control on the display device to provide an assessment of the sample based on the re-ordered array of images.

Embodiments of the method can include any one or more of the following features.

The property can include a size of the red blood cell. The method can include determining the size of the red blood cell by calculating an area or a volume of the cell. The method can include determining the size of the red blood cell by calculating a maximum dimension of the cell.

The property can include an optical density of the red blood cell. The method can include determining the optical density of the red blood cell by calculating a sum of optical densities of each member of a set of pixels that corresponds to the cell. The method can include determining the optical density of the red blood cell by calculating a mean optical density based on a set of pixels that corresponds to the cell.

The property can include a shape of the red blood cell. The method can include determining the shape of the red blood cell by calculating an area and a perimeter of the cell, and by determining a value of a ratio of a square of the perimeter to the area.

The property can include a smoothness of a perimeter of the red blood cell. The method can include determining the smoothness of the perimeter of the red blood cell by constructing a convex hull for the cell based on a set of boundary pixels associated with the cell.

The method can include setting a threshold value of the property, and displaying a fraction of the red blood cells for which a value of the property is less than or greater than the threshold value.

The property can include information about inclusions within the red blood cell.

The method can include identifying background regions associated with each of the cells in the array and applying a color to each of the background regions, where the color applied to the background region for each cell corresponds to the value of the property for the cell in relation to maximum and minimum values of the property among all cells in the array.

The array can include a radial arrangement of red blood cell images, where a displacement of each cell image from a center of the radial arrangement is proportional to a difference between a mean value of the property among all cells in the array and the value of the property for the cell corresponding to the image.

Activating the second control can include selecting a portion of the control to indicate that a patient corresponding to the blood sample does not have a disease condition. Activating the second control can include selecting a portion of the control to indicate a presence of a disease condition in a patient corresponding to the blood sample.

The disease condition can include at least one of microcytosis, macrocytosis, and anisocytosis.

Embodiments of the method can also include any of the other features disclosed herein, alone or with any of the preceding features, in any combination, as appropriate.

In another aspect, the disclosure features a system for assessing a blood sample that includes: (a) a detector configured to obtain a plurality of images of the sample, where each of the images corresponds to a single red blood cell in the sample; (b) an electronic processor configured to calculate a property for each red blood cell based on the image of that cell, and arrange the plurality of images to form an image array; and (c) an interface that includes: (i) a display device configured to display the image array; (ii) a first control configured so that when the first control is activated, the electronic processor re-orders the images in the array based on the calculated property; and (iii) a second control configured so that when the second control is activated, the electronic processor records an assessment of the sample based on the activation.

Embodiments of the system can include any one or more of the following features.

The property can include a size of the red blood cell, an optical density of the red blood cell, a shape of the red blood cell, a smoothness of a perimeter of the red blood cell, and/or information about inclusions within the red blood cell. The interface can include a third control configured to select a threshold value of the property.

Embodiments of the system can also include any of the other features disclosed herein, alone or with any of the preceding features, in any combination, as appropriate.

In a further aspect, the disclosure features a method of detecting a disease condition in a patient, the method including: (a) forming a first array of images, each image corresponding to a red blood cell from a blood sample extracted from the patient; (b) sorting the first array of images to form a second array of images, where images in the second array are ordered based on a property of the red blood cells determined from the images; and (c) detecting the disease condition based on the second array of images.

Embodiments of the method can include any one or more of the following features.

The property can include at least one of a size, an optical density, a shape, and a smoothness of the red blood cells. The method can include setting a threshold value of the property, and displaying a fraction of the cells for which a value of the property is less than or greater than the threshold value. The disease condition can include at least one of microcytosis, macrocytosis, and anisocytosis.

The property can include information about inclusions within the cells, the information about inclusions including information about at least one of a size and a shape of inclusions within the cells.

The method can include identifying background regions associated with each of the images and applying a color to each of the background regions, where the color applied to the background region of each image corresponds to the value of the property for the corresponding cell in relation to maximum and minimum values of the at least one property among all of the cells that correspond to the images.

Embodiments of the method can also include any of the other features disclosed herein, alone or with any of the preceding features, in any combination, as appropriate.

In another aspect, the disclosure features a method of assessing inclusions in red blood cells, the method including: (a) obtaining a plurality of images of the sample, where each of the images corresponds to a single red blood cell in the sample; (b) analyzing the images to identify inclusions in the cells; (c) arranging the plurality of images to form an image array, and displaying the array on a display device; (d) activating a first control on the display device to re-order the images in the array, where the images are re-ordered based on a property related to the inclusions; and (e) activating a second control on the display device to provide an assessment of the inclusions based on the re-ordered array of images.

Embodiments of the method can include any of the features disclosed herein, alone or with any of the other disclosed features, in any combination, as appropriate.

In a further aspect, the disclosure features a method of displaying images of cells in a sample, the method including: (a) obtaining a sample image, where the sample image includes multiple red blood cells; (b) identifying a set of pixels associated with each of the cells, each set of pixels forming a cell image; (c) determining a reference location for each cell based on the set of pixels; and (d) arranging the cell images to form an image array, where arranging the cell images includes positioning the cell images so that the reference location for each cell in the array is equally spaced from the reference locations for adjacent cells in the array.

Embodiments of the method can include any of the features disclosed herein, alone or with any of the other disclosed features, in any combination, as appropriate.

In another aspect, the disclosure features a method of assessing a blood sample, the method including: (a) obtaining a plurality of images of the sample, where each of the images corresponds to a single red blood cell in the sample; (b) calculating a property for each cell based on the image of that cell; (c) arranging the plurality of images to form an image array, where the images are ordered in the array based on the calculated property; (d) identifying background regions associated with each cell; and (e) displaying the image array, where displaying the image array includes, for each cell having a background region, assigning a color to the background region based on a value of the property for the cell.

Embodiments of the method can include any of the features disclosed herein, alone or with any of the other disclosed features, in any combination, as appropriate.

In a further aspect, the disclosure features a method of displaying images of cells in a sample, the method including: (a) obtaining a plurality of images of cells in the sample, where each image corresponds to a different one of the cells in the sample; (b) arranging the plurality of images to form an image array, where the images are ordered in the array according to at least one property for each of the cells derived from the plurality of images; and (c) displaying the ordered array of images, wherein the sample includes blood and the cells include red blood cells.

Embodiments of the method can include any one or more of the following features.

Each image can include a single cell in the sample.

The at least one property can include a size of the cells. The method can include determining the size of the cells by calculating an area or a volume of each of the cells. The method can include determining the size of the cells by calculating a maximum dimension of each of the cells.

The at least one property includes an optical density of the cells. The method can include determining the optical density of the cells by calculating a sum of optical densities of each member of a set of pixels that corresponds to each of the cells. The method can include determining the optical density of the cells by calculating a mean optical density for each cell based on a set of pixels that correspond to the cell.

The at least one property can include a shape of the cells. The method can include determining the shape of the cells by calculating, for each of the cells, an area and a perimeter, and by determining a value of a ratio of a square of the perimeter to the area.

The at least one property can include a smoothness of a perimeter of each of the cells. The method can include determining the smoothness of the perimeter of each cell by constructing a convex hull for each cell based on a set of boundary pixels associated with the cell.

The method can include setting a threshold value of the at least one property, and displaying a fraction of the cells for which a value of the property is less than or greater than the threshold value.

The at least one property can include information about inclusions within the cells. The information about inclusions in the cells can include information about at least one of a size and a shape of inclusions within the cells.

The method can include identifying background regions associated with each of the cell images, and applying a color to each of the background regions, where the color applied to the background region of each cell image corresponds to the value of the at least one property for the cell in relation to maximum and minimum values of the at least one property among all cells in the array.

The ordered array can include a two-dimensional rectangular arrangement of cell images. The ordered array can include a radial arrangement of cell images, where a displacement of each cell image from a center of the radial arrangement is proportional to a difference between a mean value of the at least one property among all cells in the array and a value of the at least one property for the cell corresponding to the image.

Embodiments of the method can also include any of the other features disclosed herein, alone or with any of the preceding features, in any combination, as appropriate.

In another aspect, the disclosure features a system for visual inspection of red blood cells, the system including: (a) a detector configured to obtain a plurality of images of red blood cells in a blood sample, where each image corresponds to a different one of the cells in the sample; (b) an electronic processor configured to determine a value of at least one property for each of the red blood cells from the plurality of images, and arrange the plurality of images to form an image array, where the images are ordered in the array according to the value of the at least one property; and (c) an interface configured to display the ordered array of images.

Embodiments of the system can include any one or more of the following features.

The interface can include a control configured to select the at least one property according to which the images in the array are ordered. The at least one property can include a size or a volume of the cells, an optical density of the cells, a shape of the cells, a smoothness of a perimeter of each of the cells, and/or information about inclusions within the cells, the information including at least one of a size and a shape of inclusions within the cells. The interface can include a control configured to select a threshold value of the at least one property.

The interface can be configured to display the ordered array as a two-dimensional rectangular arrangement of cell images. The interface can be configured to display the ordered array as a radial arrangement of cell images, where a displacement of each cell image from a center of the radial arrangement is proportional to a difference between a mean value of the at least one property among all cells in the array and a value of the at least one property for the cell corresponding to the image.

Embodiments of the system can also include any of the other features disclosed herein, alone or with any of the preceding features, in any combination, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

In another aspect, the present disclosure features a computer readable storage device which is encoded with computer readable instructions. Execution of the computer readable instructions by a processor causes one or more of the following operations.

A plurality of images of cells in a sample of blood can be obtained, wherein each image corresponds to a different one of the cells in the sample. The plurality of images can be arranged to form an image array, wherein the images are ordered in the array according to at least one property for each of the cells derived from the plurality of images. The ordered array of cell images can be displayed on a user interface, wherein each cell image is displayed as a user-selectable control and is configured so that when it is activated by a user, information about the corresponding cell in the sample is displayed to the user. Size of the cells can be determined by calculating an area or a volume of each of the cells. Optical density values of the cells can be determined by calculating a sum of optical densities of each member of a set of pixels that corresponds to each of the cells. Optical density values of the cells can also be determined by calculating a mean optical density for each cell based on a set of pixels that correspond to the cell. Shape of the cells can be determined by calculating, for each of the cells, an area and a perimeter, and by determining a value of a ratio of a square of the perimeter to the area. Smoothness of a perimeter of each cell can be determined by constructing a convex hull for each cell based on a set of boundary pixels associated with the cell. A threshold value of the at least one property can be set and a fraction of the cells, for which a value of the property is less than or greater than the threshold value, can be displayed. Background regions associated with each of the cell images can be identified, and a color can be applied to each of the background regions, wherein the color applied to the background region of each cell image corresponds to the value of the at least one property for the cell in relation to maximum and minimum values of the at least one property among all cells in the array.

A plurality of images of a sample of the blood can be obtained, wherein each of the images corresponds to a single red blood cell in the sample. A property for each red blood cell can be determined based on the image of that cell. The plurality of images can be arranged to form an image array, and the array can be displayed on a display device wherein each image corresponds to a single red blood cell in the sample. A first control can be activated on the display device to re-order the images in the array, wherein the images are re-ordered based on the calculated property. A second control can be activated on the display device to provide an assessment of the sample based on the re-ordered array of images. An optical density of the red blood cell can be determined by calculating a sum of optical densities of each member of a set of pixels that corresponds to the cell. An optical density of the red blood cell can be determined by calculating a mean optical density based on a set of pixels that corresponds to the cell. A shape of the red blood cell can be determined by calculating an area and a perimeter of the cell, and by determining a value of a ratio of a square of the perimeter to the area. The second control can be activated by selecting a portion of the control to indicate a presence of a disease condition in a patient corresponding to the blood sample.

A first array of images can be formed, each image corresponding to a red blood cell from a blood sample extracted from a patient. The first array of images can be sorted to form a second array of images, wherein images in the second array are ordered based on a property of the red blood cells determined from the images. The disease condition can be detected based on the second array of images.

A plurality of images of a sample of blood can be obtained, wherein each of the images corresponds to a single red blood cell in the sample. The images can be analyzed to identify inclusions in the cells. The plurality of images can be arranged to form an image array, and the array can be displayed on a display device. A first control on the display device can be activated to re-order the images in the array, wherein the images are re-ordered based on a property related to the inclusions; and second control on the display device can be activated to provide an assessment of the inclusions based on the re-ordered array of images.

A sample image can be obtained, wherein the sample image comprises multiple red blood cells. A set of pixels associated with each of the cells can be identified, wherein each set of pixels forma a cell image. A reference location can be identified for each cell based on the set of pixels, and the cell images can be arranged to form an image array, wherein arranging the cell images comprises positioning the cell images so that the reference location for each cell in the array is equally spaced from the reference locations for adjacent cells in the array.

A plurality of images of a sample of blood can be obtained, wherein each of the images corresponds to a single red blood cell in the sample. A property for each cell can be determined based on an image of that cell. The plurality of images can be arranged to form an image array, wherein the images are ordered in the array based on the calculated property. Background regions associated with each cell can be identified, and the image array can be displayed, wherein displaying the image array comprises, for each cell having a background region, assigning a color to the background region based on a value of the property for the cell.

A plurality of images of cells in a sample of blood can be obtained, wherein each image corresponds to a different one of the cells in the sample. The plurality of images can be arranged to form an image array, wherein the images are ordered in the array according to at least one property for each of the cells derived from the plurality of images. The ordered array of images can be displayed wherein the sample comprises blood and the cells comprise red blood cells.

The disclosure also features computer readable storage devices having encoded thereon computer readable instructions that, when executed by a processor, cause the processor to perform any one or more of the methods or method steps disclosed herein, in any combination as appropriate.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Figure 1:
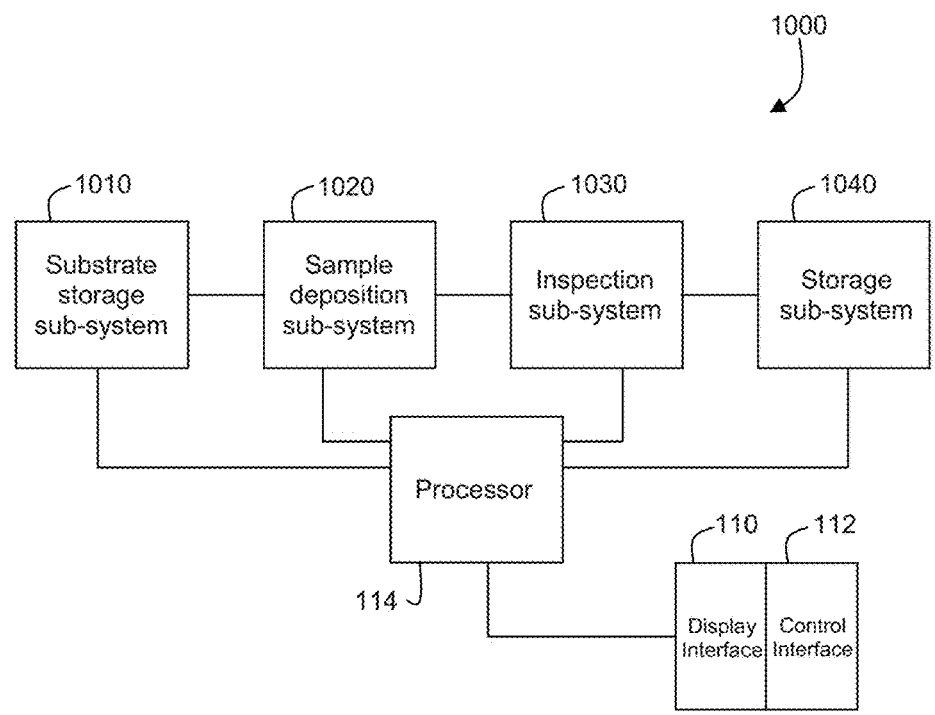
FIG. 1 is a schematic diagram of an automated system for preparing and examining blood samples.

A complete blood count (CBC) is a broad screening test that is commonly used to determine a patient's overall health status. Clinicians and laboratory technicians typically use parameters of a CBC to check a patient's blood for evidence of a variety of disorders, including various infections, anemia, and other abnormal or normal physiological conditions. These parameters typically include white blood cell count (e.g., number of white blood cells per unit volume of blood), white blood cell differential (e.g., the numbers of neutrophils, lymphocytes, monocytes, eosinophils, and basophils present in the sample), red blood cell count (e.g., number of red blood cells per unit volume of blood), hemoglobin, hematocrit (e.g., the percentage of red blood cells in a given volume of whole blood), platelet count (e.g., number of platelets per unit volume of blood), mean cell volume (e.g., mean volume of red blood cells), mean cell hemoglobin (e.g., mean amount of hemoglobin per red blood cell), mean cell hemoglobin concentration (e.g., mean concentration of hemoglobin per red blood cell), and red cell distribution width (e.g., variation in size of red blood cells in the sample). Because determination of a CBC involves multiple measurements, performing a CBC manually is time-consuming and prone to inconsistencies arising from the direct involvement of a technician.

Accordingly, systems and methods have been developed for performing automated CBC measurements. In the subsequent discussion, reference will be made to the analysis of red blood cells by way of example for illustrative purposes. However, it should be understood that the systems and methods disclosed herein can be used to analyze a variety of different blood components, including white blood cells and platelets.

Conventional systems designed to analyze red blood cells, such as flow cytometry systems, offer only relatively unsophisticated information regarding the variation of various features of red blood cells in a blood sample. For example, such systems typically provide a histogram of estimated red blood cell sizes in a particular sample; a technician then analyzes the distribution of cell sizes in the histogram and attempts to make a determination as to whether the sample is irregular based on the distribution.

The methods and systems disclosed herein provide significantly more detailed information regarding various properties of red blood cells present in a blood sample. In addition, this information is presented in a graphical display format that permits a technician to view images of individual red blood cells and directly observe trends in various cellular properties by selectively sorting the images according to the properties.

The systems and methods disclosed herein analyze blood samples to obtain a plurality of images of blood components. For example, to derive information about red blood cells in a sample (e.g., as part of a CBC determination), a plurality of images of red blood cells within the sample are obtained using methods that will be discussed subsequently. Red blood cell images and quantitative information are provided to the technician by means of a graphical user interface displayed on a display unit (e.g., display 110 in FIG. 3). An electronic processor (e.g., electronic processor 114 in FIG. 3) controls the images and information displayed, and the interface allows the technician to interact with the displayed information, and to change various views of and settings associated with the information.

Figure 7:
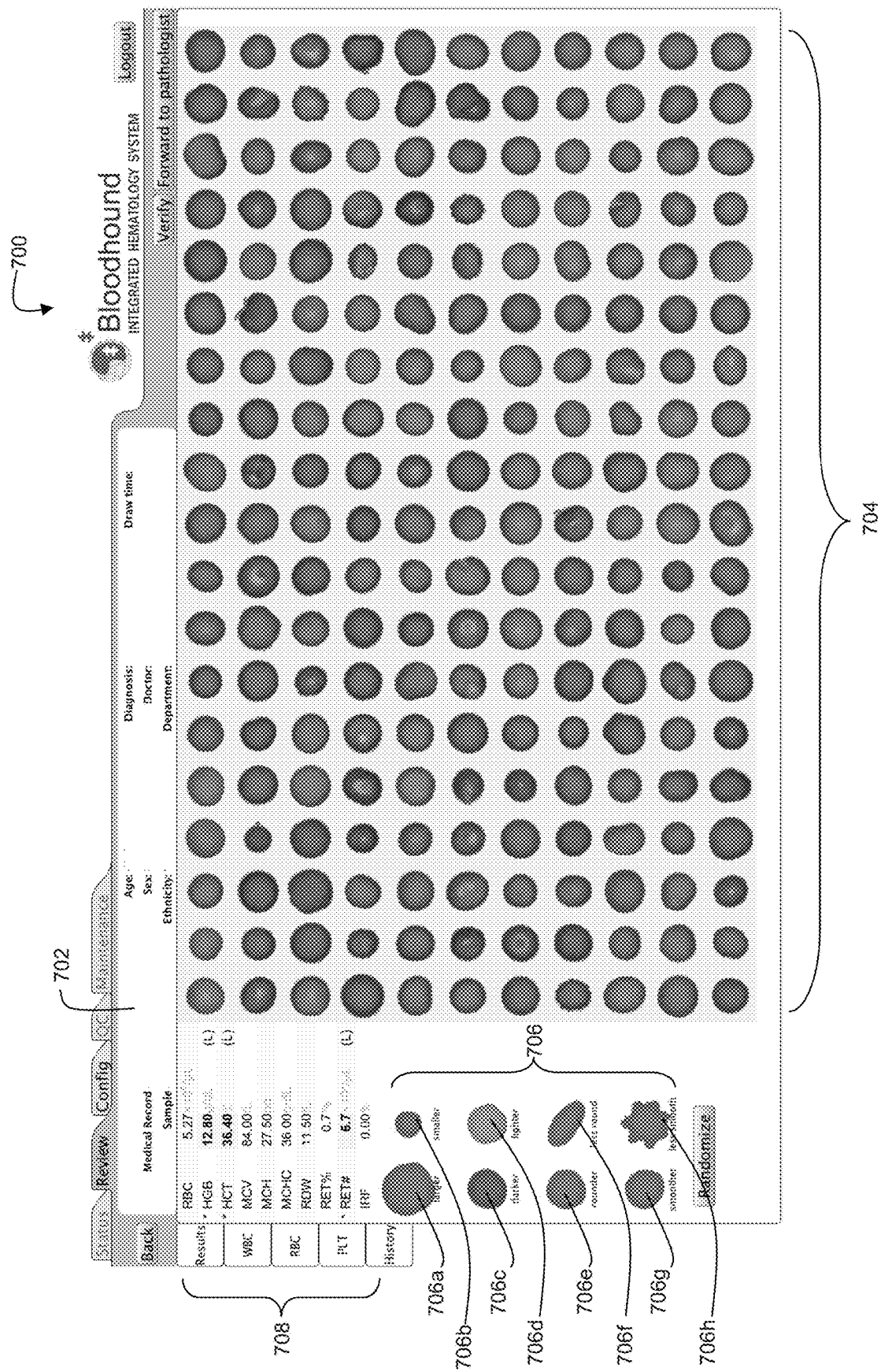
FIG. 7 is an image of a graphical user interface for display of red blood cell images.

Image Display Interfaces FIG. 7 shows an image of an embodiment of a graphical user interface 700 for display of red blood cell images. Interface 700 includes an identity block 702, an image block 704, a sorting block 706, and a data block 708. Identity block 702 is used to display a variety of information about the sample that is being reviewed by the technician. The information includes: the patient's name; an associated medical record number; a sample number; the patient's date of birth, age, sex, and ethnicity; a preliminary diagnosis; the attending physician's name and department; the hospital or laboratory name; and a draw time for the blood sample.

Image block 704 displays images of individual red blood cells. Typically, the cell images are arranged in a two dimensional array. Successive entries in the array can generally be positioned in any arrangement with respect to one another. In some embodiments, for example, successive entries are arranged adjacent to one another in rows, and when the end of a row is reached, the next entry in the array is positioned as the first entry in the subsequent row. In certain embodiments, successive entries are arranged adjacent to one another in columns, and when the end of a column is reached, the next entry in the array is positioned as the first entry in the subsequent column. In some embodiments, adjacent entries can form more complex arrangements. For example, adjacent entries may follow one another in a spiral pattern, beginning at the center of the two dimensional array in image block 704 and moving outward, or beginning at the outer edge of image block 704 and spiraling inward toward the center.

Data block 708 provides a variety of statistical information and metrics calculated by electronic processor 114 for the sample that is being reviewed. This information can include any of the following associated with red blood cells in the sample:

(a) red blood cell count in the sample (RBC), which can be reported in units of $10^6$/microliter;

(b) hemoglobin concentration in the sample (Hgb), which can be reported in units of g/dL, and which can be calculated from the product of the red blood cell count and the mean cell hemoglobin concentration;

(c) sample hematocrit (Hct), reported as a percentage, which can be calculated from the product of the mean cell volume and the total number of red blood cells divided by the sample volume;

(d) mean cell volume (MCV), which can be reported in units of fL;

(e) mean cell hemoglobin (MCH), which can be reported in units of pg;

(f) mean cell hemoglobin concentration (MCHC), which can be reported in units of g/dL, and which can be calculated as the ratio MCH/MCV and corresponds to the concentration of hemoglobin in red blood cells;

(g) red blood cell distribution width (RDW-CV), which can be reported as a percentage, and which can be calculated from the standard deviation of the distribution of individual red blood cell volumes divided by the mean of the volumes of the individual red blood cells identified and examined in the sample;

(h) red blood cell distribution width (RDW-SD), which can be determined based on a histogram of the distribution of red blood cell volumes in the sample;

(i) nucleated red blood cell count (NRBC), which corresponds to the number of nucleated red blood cells in the sample, and which can be reported in units of $10^3$/microliter;

(j) nucleated red blood cell percentage (NRBC %), which corresponds to the percentage of identified nucleated cells in the sample that are red blood cells;

(k) reticulocyte count (Retic), which corresponds to the number of reticulocytes in the sample, and which can be reported in units of $10^6$/microliter;

(l) reticulocyte cell percentage (Retic %), which corresponds to the percentage of all red blood cells in the same that are identified as reticulocytes; and (m) reticulocyte hemoglobin (RetHE), which corresponds to the hemoglobin concentration in reticulocytes, and which can be reported in units of g/dL.

In addition, the reported information can include information about a platelet count for the sample (PLT, which can be reported in units of $10^3$/microliter), and/or a mean platelet volume measurement (MPV, which can be reported in fL).

The reported information can further include one or more metrics associated with white blood cells in the sample. These metrics include:

(a) white blood cell count (WBC) for the sample, which can be reported in units of $10^3$/microliter;

(b) neutrophil count (NEUT) for the sample, which can be reported in units of $10^3$/microliter, and/or percentage of neutrophils (% NEUT) among all white blood cells in the sample;

(c) lymphocyte count (LYMPH) for the sample, which can be reported in units of $10^3$/microliter, and/or percentage of lymphocytes (% LYMPH) among all white blood cells in the sample;

(d) monocyte count (MONO) for the sample, which can be reported in units of $10^3$/microliter, and/or percentage of monocytes (% MONO) among all white blood cells in the sample;

(e) eosinophil count (EOS) for the sample, which can be reported in units of $10^3$/microliter, and/or percentage of eosinophils (% EOS) among all white blood cells in the sample;

(f) basophil count (BASO) for the sample, which can be reported in units of $10^3$/microliter, and/or percentage of basophils (% BASO) among all white blood cells in the sample; and (g) unclassified cell count (UC) for the sample, which can be reported in units of $10^3$/microliter, and/or percentage of unclassified cells (% UC) among all white blood cells in the sample.

The images in image block 704 can be displayed in random order. For example, the array in image block 704 can be populated with images as individual cells are located in one or more sample images.

Figure 8:
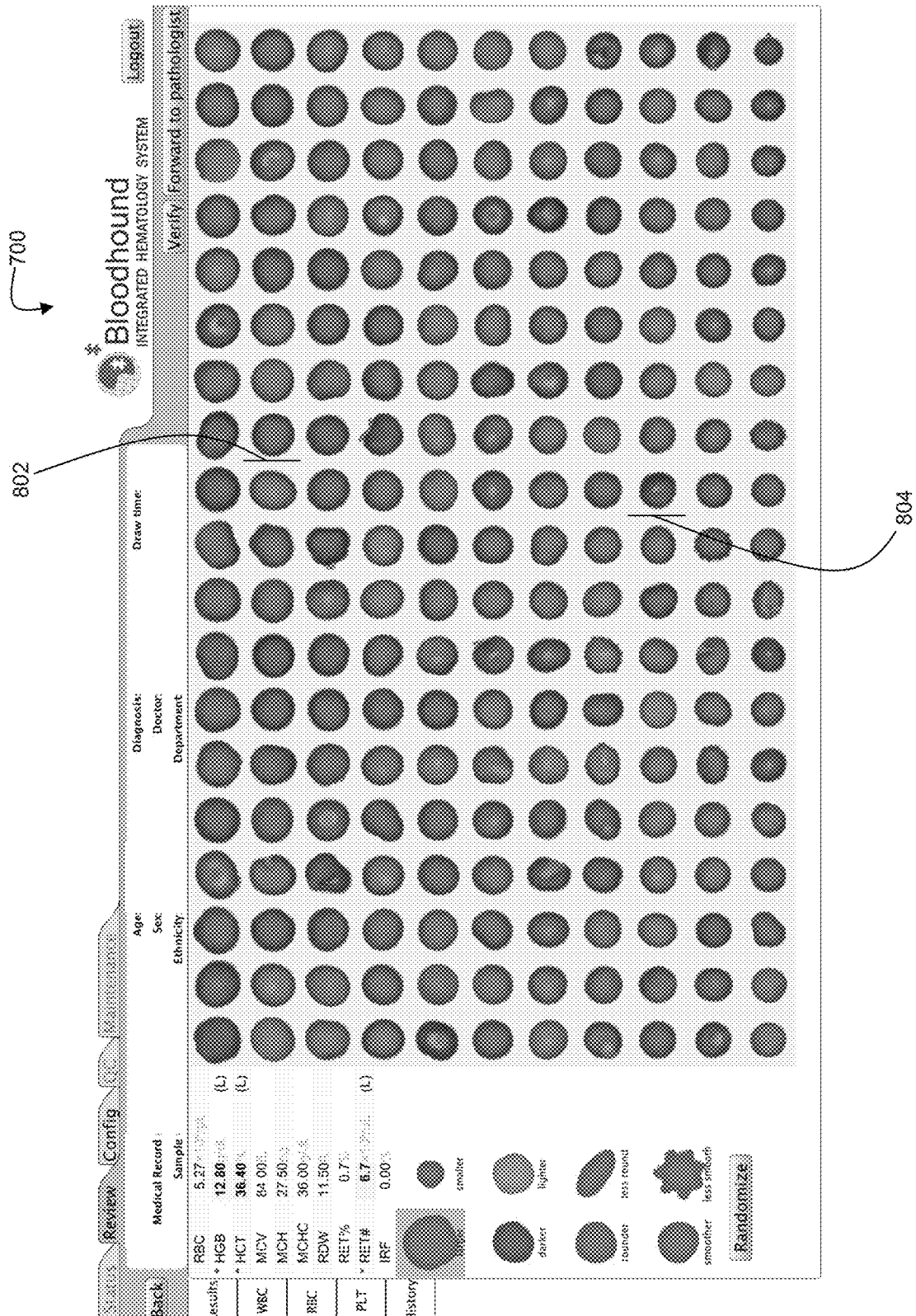
FIG. 8 is an image of a graphical user interface for display of red blood cell images in which the images are sorted by size.

Sorting block 706 includes various controls that can be activated by the technician to sort the images in image block 704 according to various properties of the individual red blood cells. For example, by selecting control 706a, the technician can sort the cell images by size, with the largest cell appearing as the first entry in the array and the smallest cell appearing as the last entry in the array. Conversely, by selecting control 706b, the technician can sort the cell images such that the first entry in the array corresponds to the smallest cell and the last entry in the array corresponds to the largest cell. In some embodiments, cell size is equated to, or related to, cell area, which can be determined using methods that are discussed subsequently herein. In certain embodiments, cell volume is equated to, or related to, cell size, and the technician can sort the cell images according to cell volume by activating controls 706 a and/or 706b. Cell volume can be determined, for example, using methods disclosed in U.S. patent application Ser. No. 13/447,045. In some embodiments, cell size refers to a maximum dimension of each particular cell. To determine a cell's maximum dimension, distances between pairs of pixels in the set of pixels that correspond to the cell are calculated; the largest such distance corresponds to the cell's maximum dimension. By calculating a "size" for each cell in this manner, the images in the array can rapidly be sorted by activating controls 706a and/or 706b. FIG. 8 shows the set of cell images from FIG. 7 sorted according to cell size, with the largest cell as the first entry in the array.

Cell images in image block 704 of FIG. 7 can also be sorted according to optical density. By activating control 706c, the images can be sorted from "darkest" to "lightest." Conversely, by activating control 706d, the images can be sorted from lightest to darkest. The "darkest" image is the one in which the optical density of the pixels is largest (e.g., the amount of transmitted light is smallest), while the "lightest" image is the one in which the optical density of the pixels is smallest (e.g., the amount of transmitted light is largest). Image darkness can be measured in a variety of ways. In some embodiments, for example, an image's "darkness" is calculated as an average optical density for all pixels in the image. Typically, the optical densities of the pixels are extracted from an image that corresponds to transmitted light in the blue region of the electromagnetic spectrum, because cells that contain hemoglobin exhibit pronounced absorption in such images. More generally, however, pixel optical densities can also be extracted from images corresponding to other regions of the spectrum, and used alone or in combination with optical densities determined in the blue region of the spectrum.

Figure 9:
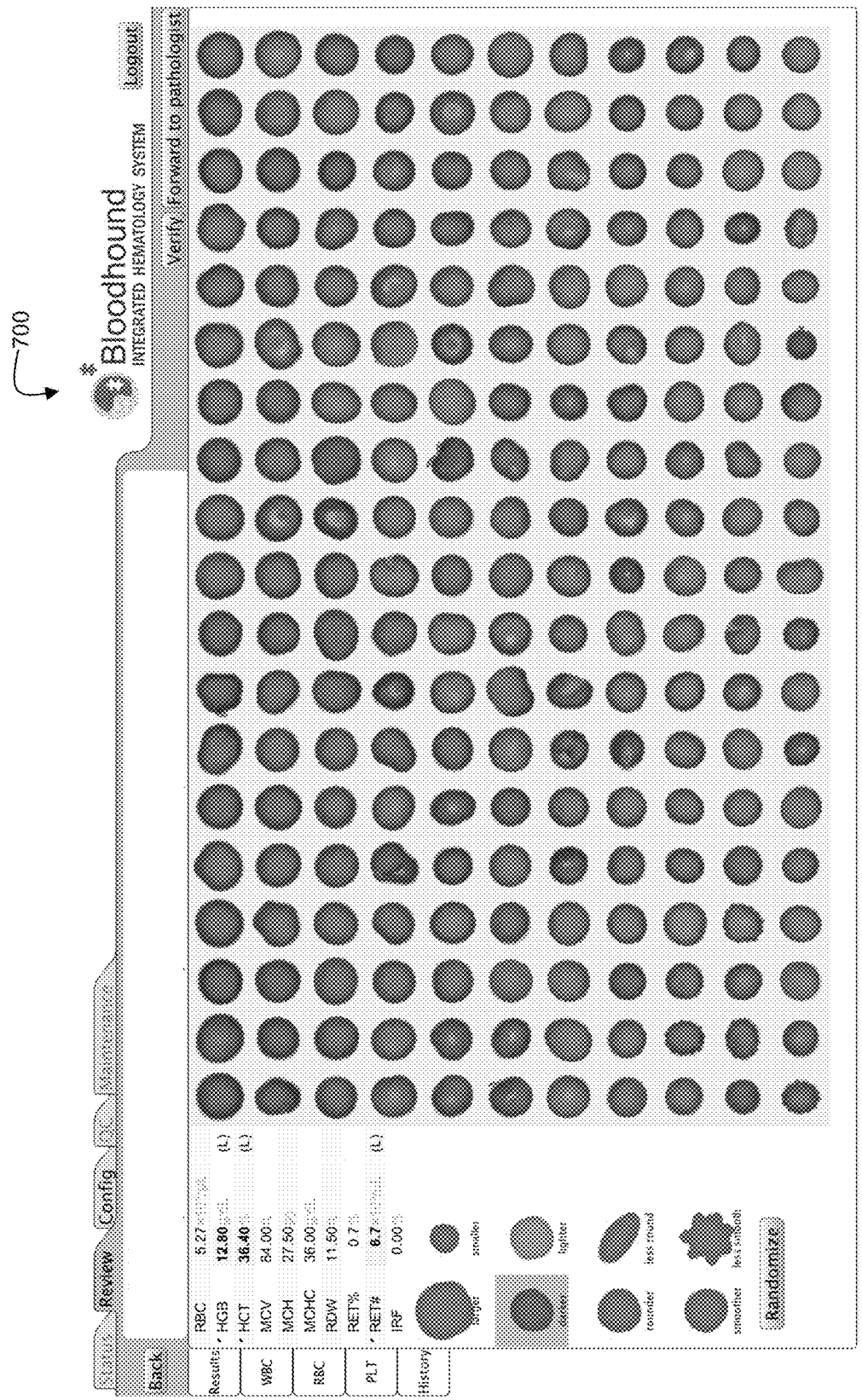
FIG. 9 is an image of a graphical user interface for display of red blood cell images in which the images are sorted by darkness.

Alternatively, in certain embodiments, an image's "darkness" is calculated as an integrated optical density for all pixels in the image. In some embodiments, amounts of constituents such as hemoglobin are equated to, or related to, cell darkness. Accordingly, by activating controls 706c and/or 706d, a technician can sort the cells in image block 704 according to constituent amounts in the cells. In certain embodiments, separate controls are provided within sorting block 706 (not shown in FIG. 7) to permit sorting by amounts of particular constituents within cells. For example, controls are provided to permit the technician to sort the array of cell images according to the amount of hemoglobin within the cells. Methods for determining the amounts of constituents such as hemoglobin within cells are disclosed, for example, in U.S. patent application Ser. No. 13/446,967. Regardless of the metric used to determine each image's darkness, the cell images in image block 704 can be rapidly sorted by activating controls 706c and/or 706d. FIG. 9 shows the set of cell images from FIG. 7 sorted according to cell darkness, with the darkest cell as the first entry in the array.

Figure 10:
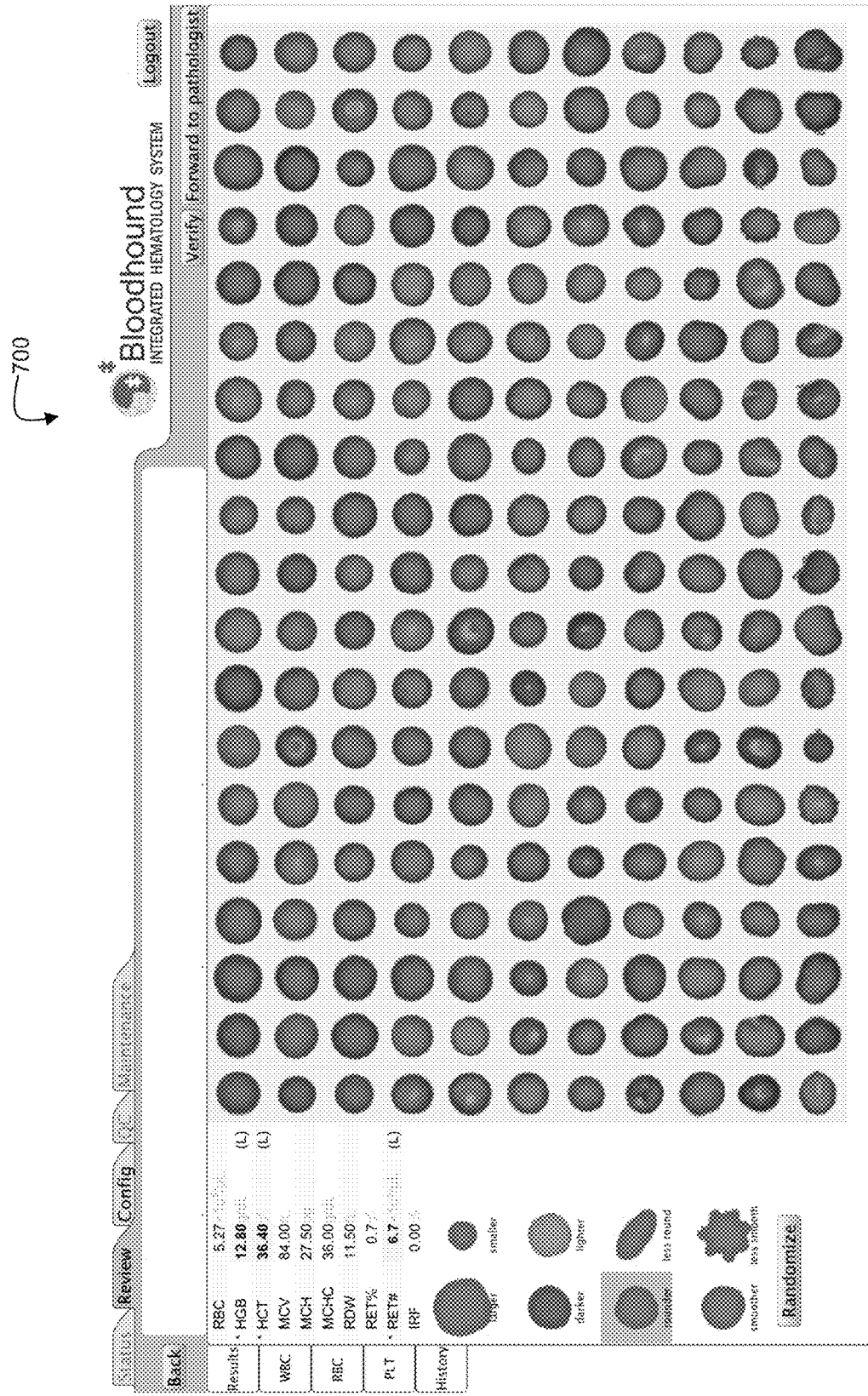
FIG. 10 is an image of a graphical user interface for display of red blood cell images in which the images are sorted by roundness.

Cell images in image block 704 can be sorted by shape by activating controls 706e and 706f. A measure of each cell's shape (or "roundness") can be determined by comparing the ratio of the square of the cell's perimeter to its area. For cells that are perfectly round in cross-section, this ratio has a value of 47. The greater the extent to which a cell's cross-sectional shape is non-circular, the larger the amount by which the ratio exceeds 471. By activating control 706e, the technician can sort the images in image block 704 according to roundness, with the cell having the most circular cross-sectional shape in the first array position. Activating control 706f sorts the cells in the opposite sense, with the cell having the most non-circular cross-sectional shape in the first array position. FIG. 10 shows the set of cell images from FIG. 7 sorted according to roundness, with the most circular cell as the first entry in the array.

Figure 11:
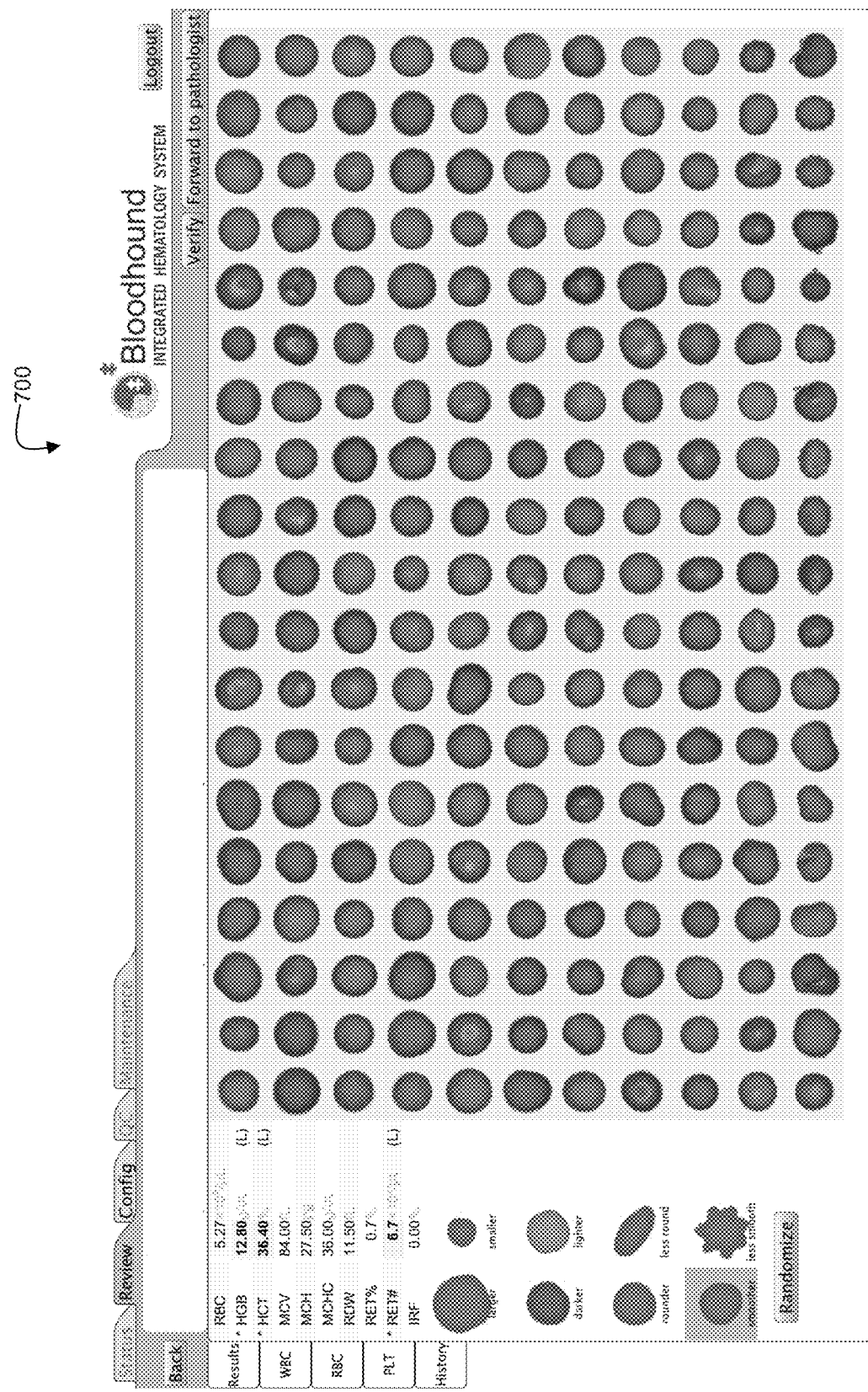
FIG. 11 is an image of a graphical user interface for display of red blood cell images in which the images are sorted by smoothness.

Cell images in image block 704 can also be sorted according to "smoothness" of the perimeter of the cell. For example, by activating control 706g, the technician can sort the cell images such that the cell with the smoothest perimeter appears as the first entry in the array. By activating control 706h, the technician can sort the images such that the cell with the least-smooth perimeter appears as the first entry. In general, "smoothness" can be determined for each cell image by calculating a ratio of a perimeter of a cell determined from a polygon associated with the cell to a perimeter of the cell determined from its associated convex hull, as discussed subsequently herein. For a cell that is purely convex in shape (e.g., circular), the ratio of the two perimeters will have a value of 1. For a cell with surface undulations, the perimeter ratio will be larger than 1. FIG. 11 shows the set of cell images from FIG. 7 sorted according to smoothness, with the cell having the smoothest perimeter as the first entry in the array.

Figure 13A:
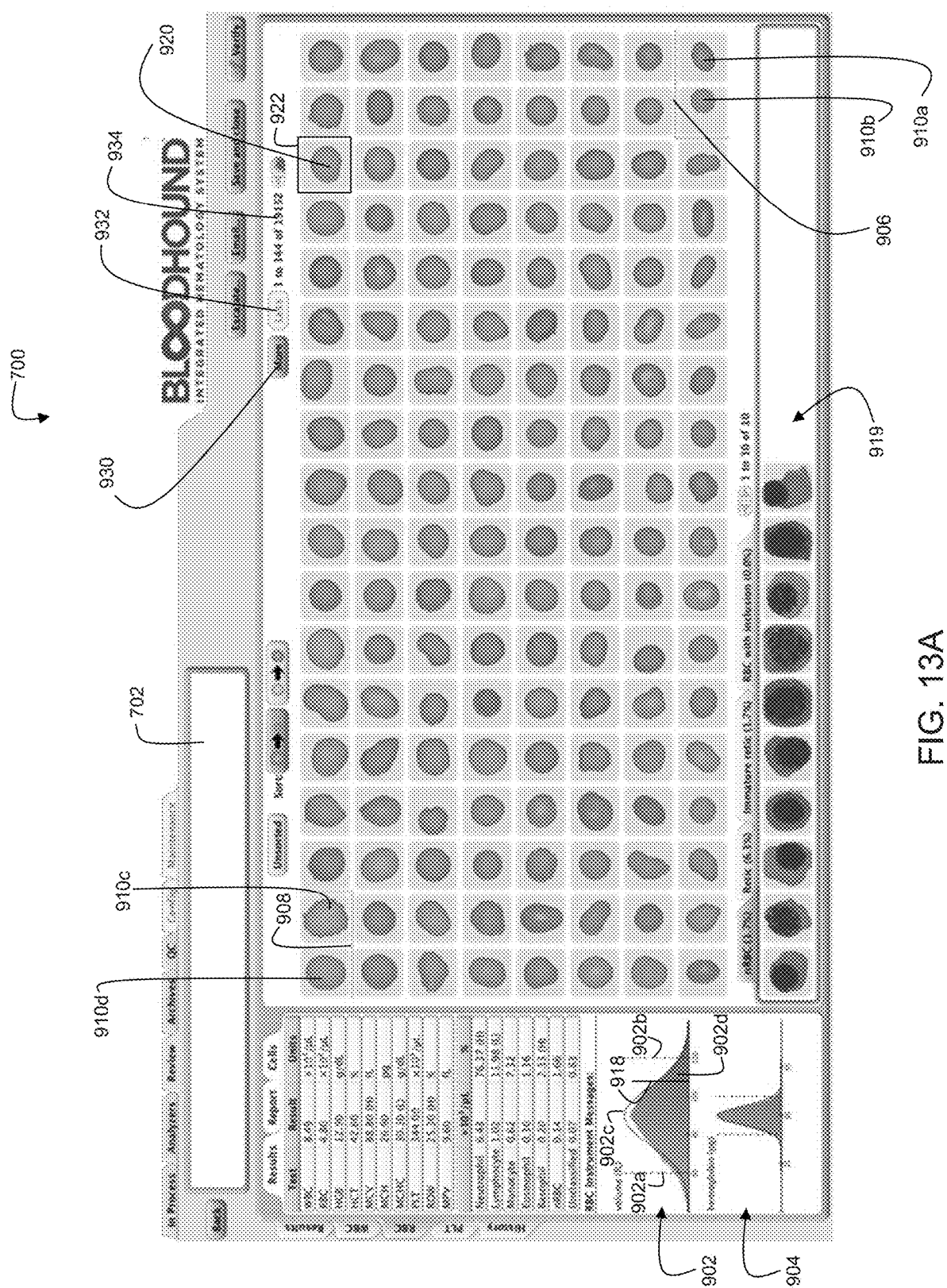
FIG. 13A is an image of a graphical user interface for display of red blood cell images and distributions of parameters associated with the cells.
Figure 13B:
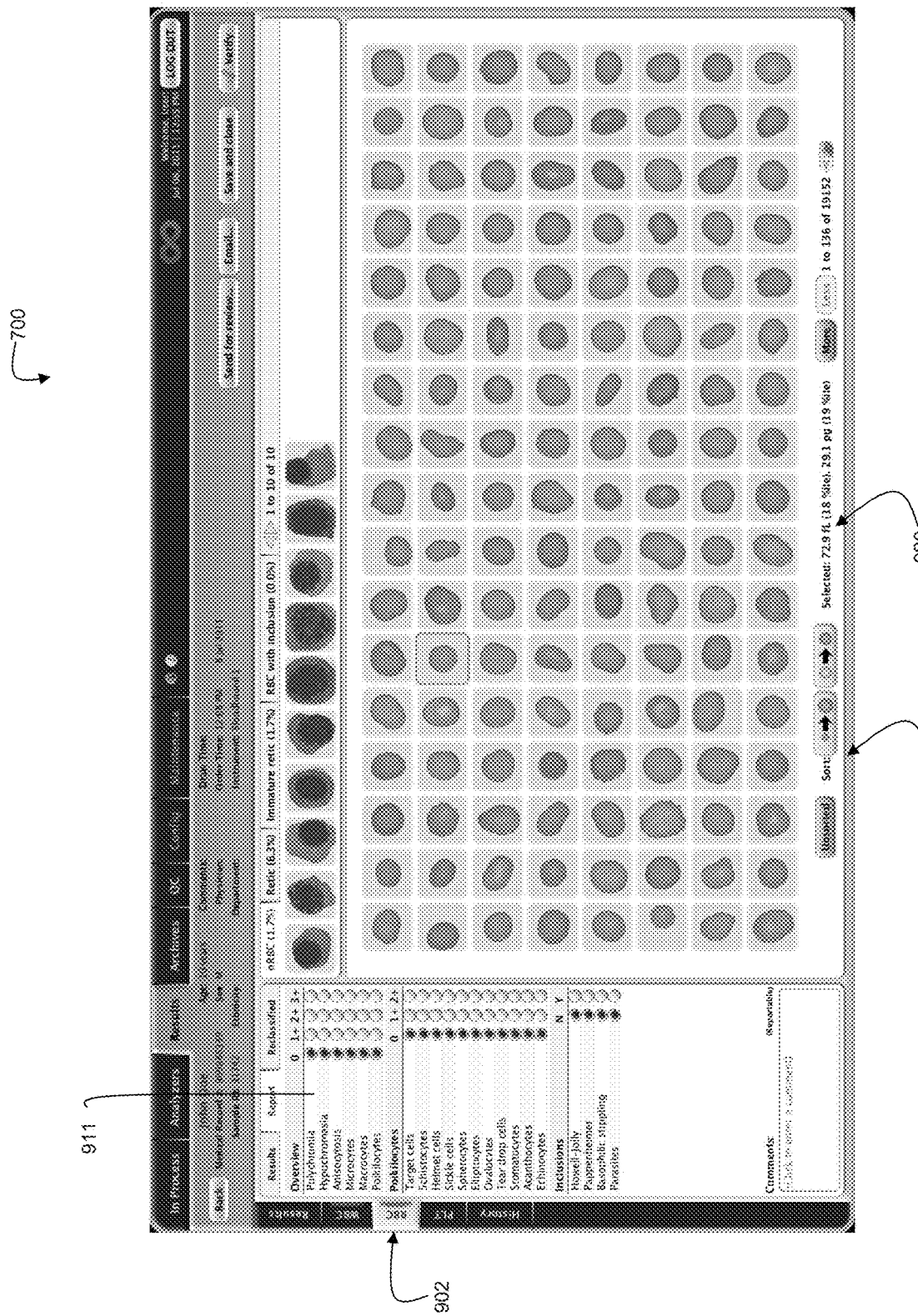
FIG. 13B is an image of a graphical user interface for classification of red blood cell images.

Interface 700 also permits a technician to establish a number of thresholds for purposes of assessing the distributions of properties associated with the cells in image block 704. For example, referring to FIG. 8, interface 700 permits a technician to set an upper size threshold 802. Interface 700 then reports to the technician the percentage of cells that have a size that exceeds upper size threshold. By sorting the cell images according to size, the technician can then determine, for example, whether macrocytosis is present in the sample. Similarly, interface 700 permits the technician to set a lower size threshold 804. Interface 700 then reports to the technician the percentage of cells that have a size that is smaller than the lower size threshold, and the technician can assess whether microcytosis is present in the sample. Further, by comparatively examining the percentages of cells with sizes larger than upper threshold 802, smaller than lower threshold 804, and between the upper and lower thresholds, the technician can determine whether anisocytosis is present in the sample. Interface 700 can also include user-selectable controls (e.g., radio buttons as shown in FIG. 13B) that allow the technician to indicate whether microcytosis, macrocytosis, or anisocytosis is suspected for the sample undergoing review.

Other parameters and metrics that are calculated by the system and reported to the technician by interface 700 can also be used (e.g., by the technician, or by a physician) to detect, identify, and/or diagnose disease conditions in a patient. For example, information that a patient's reported red blood cell count is low can be used to detect or identify the possibility of anemia and/or general fatigue in the patient. Similarly, information that a patient's reported hemoglobin concentration is low can be used to detect or identify a deficiency of iron and the possibility of anemia in the patient associated with a decreased ability of the patient's blood to carry oxygen to body tissues. Information about a mean cell volume that is either larger or smaller than predefined threshold values, and/or a mean cell hemoglobin measurement that is low, may also be used to detect or identify anemia in the patient.

Information about a low platelet count may be used to diagnose thrombocytopenia in the patient. Information about a high white blood cell count may be used by the technician to detect or identify a possible current infection in the patient. Conversely, information about a low white blood cell count may be used to detect or identify an increased risk of infection. In particular, low counts of neutrophils, lymphocytes, and/or monocytes may suggest that the patient is at an increased risk of infection from bacteria, viruses, or fungi. Information about high counts of eosinophils and/or basophils can be used to detect possible allergies and/or parasitic infections in the patient.

The detection of many disease conditions can depend in part upon the establishment of threshold values of the various parameters and metrics reported by the system. By establishing such thresholds, the technician can quickly determine whether individual cells fall within the thresholds, and what fraction of the cells that are displayed by interface 700 fall outside the lower and upper thresholds for a given sorting parameter.

In general, interface 700 permits a technician to establish one or more threshold conditions for any of the parameters associated with the cells in the image array. That is, a reviewing technician can set threshold values for darkness, roundness, and smoothness of the red blood cells. For each threshold, interface 700 reports to the technician the percentage (and/or count) of cells that lie on either side of the threshold. When multiple thresholds are established, interface 700 can be configured to report the percentage and/or count of cells that lie between each bounding pair of threshold values. In some embodiments, thresholds are fully user-selectable and established at the discretion of the technician. In certain embodiments, suitable thresholds for various properties can be obtained, e.g., from hospitals and/or clinical laboratories, and stored for selective application under the direction of the technician. Table 1 shows exemplary upper and lower thresholds for various CBC parameters that can be reported by the system; on the basis of parameters such as these, the technician can determine whether one or more parameters associated with a patient's sample fall outside acceptable ranges, and can use this information to detect or identify disease conditions in the patient.

TABLE 1

| Parameter | Age | Male Lower | Male Upper | Female Lower | Female Upper |
|---|---|---|---|---|---|
| Red Blood Cell | 6 mo-2 yr | 3.70 | 5.30 | same | same |
| Count (RBC) | 2 yr-6 yr | 3.90 | 5.30 | same | same |
| ($10^6$/μL) | 6 yr-12 yr | 4.00 | 5.20 | same | same |
|  | 12 yr-18 yr | 4.50 | 5.30 | 4.10 | 5.10 |
|  | 18 yr+ | 4.40 | 5.60 | 3.80 | 5.00 |
| Hemoglobin | 6 mo-2 yr | 10.5 | 13.5 | same | same |
| Concentration | 2 yr-6 yr | 11.5 | 13.5 | same | same |
| (Hgb) (g/dL) | 6 yr-12 yr | 11.5 | 15.5 | same | same |
|  | 12 yr-18 yr | 13.0 | 15.5 | 12.0 | 15.5 |
|  | 18 yr+ | 13.0 | 18.0 | 11.5 | 15.5 |
| Hematocrit | 6 mo-2 yr | 33 | 39 | same | same |
| (Hct) (%) | 2 yr-6 yr | 34 | 40 | same | same |
|  | 6 yr-12 yr | 35 | 45 | 35 | 45 |
|  | 12 yr-18 yr | 37 | 49 | 36 | 45 |
|  | 18 yr+ | 38 | 50 | 36 | 45 |
| Mean Cell Volume | 6 mo-2 yr | 70 | 86 | same | same |
| (MCV) (fL) | 2 yr-6 yr | 75 | 87 | same | same |
|  | 6 yr-12 yr | 77 | 95 | same | same |
|  | 12 yr-18 yr | 81 | 98 | same | same |
|  | 18 yr+ | 81 | 98 | same | same |
| Mean Cell | 6 mo-2 yr | 23.0 | 31.0 | same | same |
| Hemoglobin | 2 yr-6 yr | 24.0 | 30.0 | same | same |
| (MCH) (pg) | 6 yr-12 yr | 25.0 | 33.0 | same | same |
|  | 12 yr-18 yr | 25.0 | 35.0 | same | same |
|  | 18 yr+ | 27.3 | 33.6 | same | same |
| Mean Cell | 6 mo-2 yr | 30.0 | 36.0 | same | same |
| Hemoglobin | 2 yr+ | 32.3 | 35.7 | same | same |
| Concentration |  |  |  |  |  |
| (MCHC) (g/dL) |  |  |  |  |  |
| Platelets | 0-1 mo | 250 | 450 | same | same |
| (Thrombocytes) | 1 mo-1 yr | 300 | 750 | same | same |
| ($10^3$/μL) | 1 yr-3 yr | 250 | 600 | same | same |
|  | 3 yr-7 yr | 250 | 550 | same | same |
|  | 7 yr-12 yr | 200 | 450 | same | same |
|  | 12 yr+ | 150 | 400 | same | same |
| White Blood | 6 mo-2 yr | 6.0 | 17.0 | same | same |
| Cell Count | 2 yr-4 yr | 6.0 | 15.5 | same | same |
| (WBC) | 4 yr-6 yr | 5.5 | 14.5 | same | same |
| ($10^3$/μL) | 6 yr-14 yr | 4.5 | 13.5 | same | same |
|  | 14 yr+ | 4.3 | 10.0 | same | same |
| Neutrophil Count | 6 mo-1 yr | 1.50 | 5.00 | same | same |
| (NEUT) ($10^3$/μL) | 1 yr-4 yr | 1.50 | 5.00 | same | same |
|  | 4 yr-10 yr | 1.50 | 7.50 | same | same |
|  | 10 yr-12 yr | 1.80 | 7.00 | same | same |
|  | 12 yr+ | 1.80 | 7.00 | same | same |
| Lymphocyte | 6 mo-1 yr | 3.00 | 7.00 | same | same |
| Count | 1 yr-4 yr | 1.50 | 8.50 | same | same |
| (LYMPH) | 4 yr-10 yr | 1.50 | 5.00 | same | same |
| ($10^3$/μL) | 10 yr-12 yr | 1.20 | 5.00 | same | same |
|  | 12 yr+ | 1.00 | 4.80 | same | same |
| Monocyte Count | 6 mo-1 yr | 0 | 0.60 | same | same |
| (MONO) | 1 yr+ | 0 | 0.80 | same | same |
| ($10^3$/μL) |  |  |  |  |  |
| Eosinophil Count | 6 mo-1 yr | 0 | 0.80 | same | same |
| (EOS) ($10^3$/μL) | 1 yr+ | 0 | 0.50 | same | same |
| Basophil Count | 6 mo+ | 0 | 0.20 | same | same |
| (BASO) ($10^3$/μL) |  |  |  |  |  |

In addition to the sorting criteria disclosed above, cell images can be sorted according to a variety of other properties and metrics. In some embodiments, cell images can be sorted according to their darkness within a specific spectral band. For example, certain stains are known to selectively bind to RNA in red blood cells, which is present in larger concentrations in reticulocytes. By sorting cells according to their optical density in the blue region of the electromagnetic spectrum, the presence and distribution of reticulocytes in the sample can be assessed. For example, young reticulocytes are often released from bone marrow when blood lost as a result of trauma is being replaced. By sorting cells according to their optical density in the blue region of the spectrum, the number of young reticulocytes in a sample can be determined; this can be used to infer information about blood replacement activity in the patient. Reticulocytes can also be identified by measuring each cell's relative absorption of incident light at both yellow and blue wavelengths. Reticulocytes typically absorb more strongly at yellow wavelengths than mature red blood cells, because the applied stain specific for cellular RNA has an absorption peak in a yellow region of the electromagnetic spectrum. Moreover, reticulocytes typically absorb less strongly in the blue region of the spectrum than mature red blood cells because the hemoglobin in reticulocytes is not yet fully formed.

More generally, cell images can be sorted according to optical density at a variety of different wavelengths. In some embodiments, for example, cell images can be sorted according to optical density in the yellow, blue, green, or red regions of the spectrum. In certain embodiments, cell images can be sorted according to metrics derived from optical densities at multiple wavelengths. For example, cell images can be sorted according to the difference between optical densities in the yellow and blue regions.

In some embodiments, the presence of one or more inclusions in red blood cells can be identified. For example, malaria parasites typically appear as small rings in cell images. Basophilic stipling, which is produced by regions of condensed RNA and/or DNA, typically appears as small blue dots in red blood cell images. These conditions can be automatically identified and reported to a technician. More generally, inclusions can appear in cell images as dark regions of small to moderate size; the irregular presence of such regions is indicative that such regions correspond to inclusions. The technician can also sort the array images according to the presence and/or absence of inclusions, the number of inclusions, and/or the size of inclusions, to assess factors such as the presence of infection in the sample. Images can also be sorted according to other geometric properties of the inclusions, including inclusion shape, roundness, and smoothness. These properties of the inclusions can be determined in the same manner as for cells, as disclosed above.

Generally, cells can also be sorted according to measurements such as absorption (or the absence of absorption) in a particular region of the electromagnetic spectrum (e.g., polychromism, hypochromism), by cytoplasmic ratio, and by standard deviation of optical density. In particular, sorting by standard deviation of optical density can permit ordering of cells based on the presence of a central pallor, or a "target"-like cross-sectional intensity distribution. Such cells can be further distinguished from one another by individually selecting cells; when cells are individually selected, the system displays an enlarged image of the selected cell, which the technician can then use to distinguish between different prospective cross-sectional shapes.

In certain embodiments, the background region in image block 704 can be color-coded to highlight particular features of the cells. For example, instead of (or in addition to) indicating thresholds using separation lines as in FIG. 8, the background regions for cells with a property that falls above, below, or within certain thresholds can be colored to indicate graphically the relative distribution of values of the cells with regard to that property. In some embodiments, the rate of change of a property upon which the cell images are sorted in interface 700 can be used to establish a color gradient for the background region in image block 704. That is, the first position in the cell image array can correspond to a particular background color, the last position in the array can correspond to a different background color, and the rate of change of the property according to which the cell images are sorted can be used to map the gradient of color for each cell image between the first and last cell images in the array.

In some embodiments, the cells in each of the cell images can be color-coded by applying highlighting (e.g., encircling the cells) to the images. As disclosed above, the applied highlights can vary in color from the first array entry to the last array entry to depict variations in the cell property that forms the basis for ordering the array. For example, when the array is ordered according to shape, cells with a highly circular cross-section can be encircled in red, cells with a highly non-circular cross-section can be encircled in blue, and cells of an intermediate cross-sectional shape can be encircled by a colored band that represents a composite of red and blue colors (e.g., a shade of purple intermediate between the red and blue colors, where the particular shade of the band encircling a given cell correlates with a quantitative metric that describes the cell's shape).

In certain embodiments, to improve visualization of changes in the value of a particular property among individual cells in the array, the cell images can be positioned in the array according to a reference location determined for each individual cell. For example, as disclosed herein, individual cells can be identified in a sample image, and a subset of pixels corresponding to each cell can be identified. Then, a reference location for each cell can be determined based on each cell's corresponding subset of pixels. As an example, for cells that are assumed to have a regular cross-sectional shape (e.g., circular or elliptical), an approximate circular or elliptical boundary can be fitted to the shape defined by the subset of pixels, and the reference location of the cell can be determined as the center of the fitted boundary. As another example, optical density values for each of the pixels in the subset of pixels that correspond to the cell can be used to calculate a center of mass for the cell, which functions as the reference location for the cell. As a further example, a reference location for certain cells can be identified based on a central pallor of the cells. Cells with a central pallor tend to appear brighter (e.g., the optical density is less) in their centers due to the reduced thickness of the cell in the region of the pallor. The center of the brighter region corresponding to the pallor can be identified as the reference location for the cell.

When reference locations have been identified for each of the cells, the cells can be positioned in the array by spacing the cells so that the distances between reference locations for each pair of nearest-neighbor adjacent cells in the array is the same. Thus, for example, in a two-dimensional array of cells, any cell that is not positioned on an edge of the array has four nearest-neighbor adjacent cells. Cells can be positioned in the array so that the distances between the reference location of a particular cell and the reference location for each of the cell's four nearest neighbors are equal. As disclosed above, reference locations for cells can correspond to geometric centers of the cells, centers-of-mass of the cells, locations defined by other cell features such as the center of a central pallor region, and/or other locations within the cells.

By regularizing the spacings between the displayed cells in the array (rather than the spacings between adjacent images that include the cells, but in which the cells may not be perfectly centered, for example), the array appears more spatially uniform, making it easier for a technician to discern variations among individual cell members of the array with respect to one or more properties of the cells. Combining regularized spacing of the cells with color coding of either the cells or the cell backgrounds according to measured cell properties allows trends among the cells to be visualized on a repeatable, regularized spatial scale.

Figure 12:
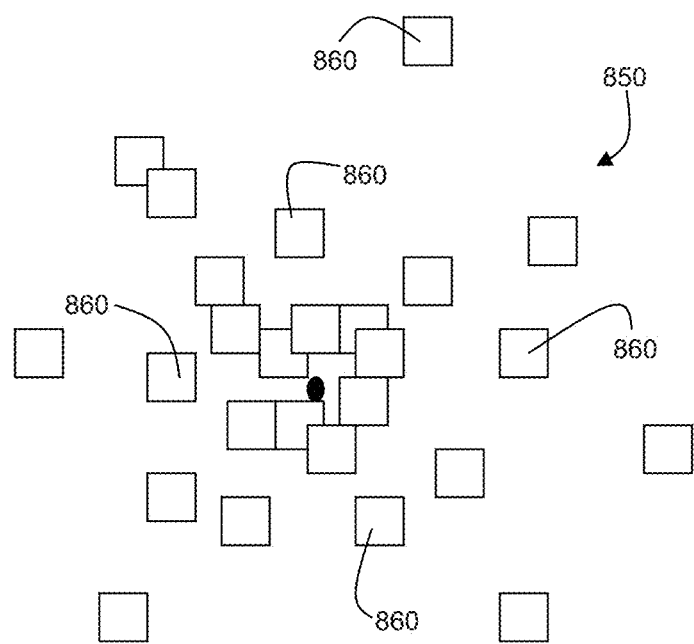
FIG. 12 is a schematic diagram of a cell image array in which images are positioned relative to a mean value of a property of the cells.

Although the cell image array in image block 704 is depicted as a rectangular array of images in FIGS. 7-11, more generally, a variety of different display modalities can be used. In some embodiments, for example, array images can be plotted based on their distance from a mean value of the property according to which the cell images are sorted. FIG. 12 shows a schematic diagram of an array 850 of cell images in which images 860 are sorted according to a property of the cells. Among the entire population of cells, the property has a mean value. In FIG. 12, the darkened circular center of the array corresponds to the mean value of the property. Images 860 in FIG. 12 are plotted according to the difference between each corresponding cell's value of the property and the mean value. The larger this difference, the further the cell image is positioned away from the center.

In FIG. 7, a single array of cell images is displayed in image block 704. More generally, however, interface 700 can include multiple image blocks, each of which can display an array of cell images. For example, in some embodiments, interface 700 can include two image blocks, each of which displays an array of cell images. The set of cell images arrayed in each image block can be from the same sample, or from a different sample. The same set of cell images can be displayed in both image blocks. The cell images in each of the image blocks can be sorted according to the same properties, or according to different properties. In certain embodiments, the same set of cell images appears in both image blocks, and is sorted according to the same property in both blocks, but the sort order is reversed. For example, in a first one of the image blocks, cells are sorted by size from largest to smallest, and in the second image block, the cells are sorted by size from smallest to largest. In general, any of the methods and criteria disclosed herein for sorting cell images can be applied to each of multiple image blocks as desired.

Although in FIG. 7 each of the cell images includes only a single red blood cell, more generally the cell images can include additional cells to provide the technician with visual context. When more than one cell is present in cell images, the particular cell of interest can be positioned at the center of the image, and/or can be highlighted (e.g., through the use of color) to distinguish it from the other cells in the image.

Interface 700 can also be configured to display a variety of additional information to the technician to assist the technician in assessing the nature of a sample. In some embodiments, for example, interface 700 displays one or more histograms associated with the various parameters reported for the sample. FIG. 13A shows an interface 700 in which histograms 902 and 904 for mean cell volume and mean cell hemoglobin, respectively, are displayed. In histogram 902, the lower and upper mean cell volume threshold values for "healthy" patients are shown as dashed lines 902a and 902b, respectively. The expected overall distribution of mean cell volume is shown as solid line 902c. The actual distribution of mean cell volume values is shown as the shaded graph 902d. This information allows the technician to assess how closely the expected distribution of mean cell volume values matches the measured distribution, and to determine in relative terms what fraction of cells fall outside the lower and upper threshold values. The lower and upper thresholds are also indicated in the image block as separators 906 and 908, respectively. By referring to the image block, the technician can quickly see that cells 910a and 910b have mean cell volume values that fall below the lower threshold value, and cells 910c and 910d have mean cell volume values that fall above the upper threshold value.

As shown in FIG. 13B, the interface 700 can also be configured to include a report 911, e.g., a "scoring system," that allows a user to select values for different cells and blood constituents. For example, each blood constituent can have several ranges or "scores" associated with them at least one of which is selectable by a user. Ranges can be actual or approximate. In some cases, the associated scores can be user configurable such that different laboratories and institutions are able to configure the representation of the scores. For example, FIG. 13B shows the scores as 0, 1+, 2+ and 3+, respectively. Skilled practitioners will appreciate that scoring systems can vary from laboratory to laboratory. For example, for a given laboratory, the number 1+ can represent a range of 5-10 cells per oil immersion field, 2+ can represent a range of 10-15 cells per oil immersion field and 3+ can represent a range of 15 or higher number of cells per oil immersion field. For another laboratory or institution, these numbers can represent other ranges. In some cases other representations can also be used. The report 911 allows a user to generate a report based on the images made available through the interface 700. The report 911 also allows a user to add comments to the report.

In general, the interface 700 displays results for different blood constituents separately. A desired blood constituent can be selected, for example, based on a dedicated tab such as tab 902 shown in FIG. 13B that displays the results for red blood cells. In some embodiments, if abnormal cells are detected for a certain blood constituent, the corresponding tab can be marked appropriately. For example, FIG. 13B shows that the tabs for red blood cells (RBC) and white blood cells (WBC) are underlined in red whereas the tab for platelets (marked as PLT) is not underlined. This conveys that the corresponding patient has abnormal red and white blood cells but no abnormal platelets.

In some embodiments, when a particular image is selected, interface 700 can be configured to display one or more parameters 990 for the cell or blood constituent in the selected image. For example, the displayed parameters 990 can include the cell volume and hemoglobin content for the cell. In some embodiments, when multiple images are selected, the displayed parameters 990 can include the average for the corresponding multiple cells. The interface 700 can also include one or more selectable buttons to sort or unsort the displayed images (in ascending or descending order) based on, for example, the size of the corresponding cells.

Figure 14A:
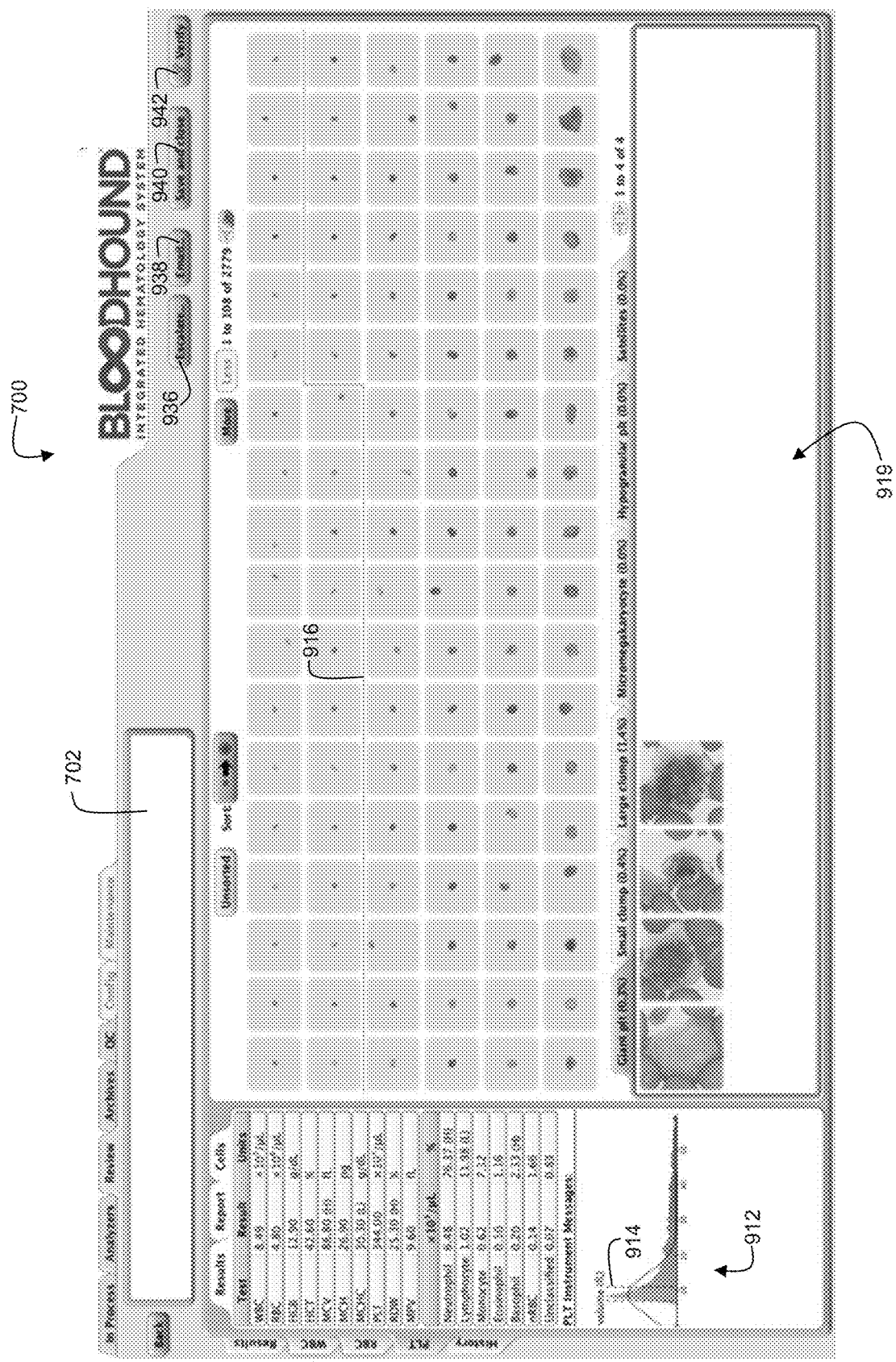
FIGS. 14A and 14B are images of a graphical user interface for display of platelet images that include sampling display blocks.

Similar information is provided in FIG. 14A, which shows a histogram 912 associated with platelet volume measurements for the sample. The upper threshold is indicated by vertical line 914 in the histogram, and is also shown as separator 916 in the image block. As is readily apparent from FIG. 14A, a large fraction of platelets in the sample have a platelet volume that exceeds the upper threshold, indicating a possible disease condition in the patient.

In some embodiments, each of the cell images in the image block functions as a user-selectable control. For example, returning to FIG. 13A, by selecting cell 920 (e.g., by "clicking" on the cell image), the cell is highlighted (e.g., a highlighting box 922 is displayed around the cell image). Further, when a particular cell is selected, information specific to that cell can be displayed to the technician. As shown in histogram 902, for example, an indicator 918 can be displayed to indicate the position of cell 920 within distribution 902d. Additional information about the selected cell can be displayed, e.g., in the data block, such as calculated values of the cell volume and/or cell hemoglobin concentration, and/or a polychromism value for the cell which is related to the cell's absorption properties in the blue region of the spectrum.

Further, by selecting a particular cell, a variety of different controls can be activated by the technician to permit further interaction with the cell. For example, by activating an "assignment" control, the technician can assign the cell to a different class from the one to which the cell was automatically assigned by the system.

Referring to FIG. 14A, the technician can activate additional controls to take a variety of actions with respect to the entire sample. For example, by activating control 936, the technician can send the sample to a supervisor for further review. By activating control 938, the technician can email the sample record (or cell images) to another person for additional review. In some embodiments, the person to whom the sample record is to be sent can be selected from a drop down menu. The drop down menu can be pre-populated with, e.g., names of persons and/or institutions authorized to access and/or receive the data for the corresponding patient. Activating control 940 allows the technician to terminate review of the sample without saving the sample record in a laboratory data storage system. In contrast, by activating control 942, the technician can save the sample record in the laboratory data storage system. In some embodiments, saving the sample record is not allowed by the system unless all unclassified images in the record have been reviewed and classified.

Figure 14B:
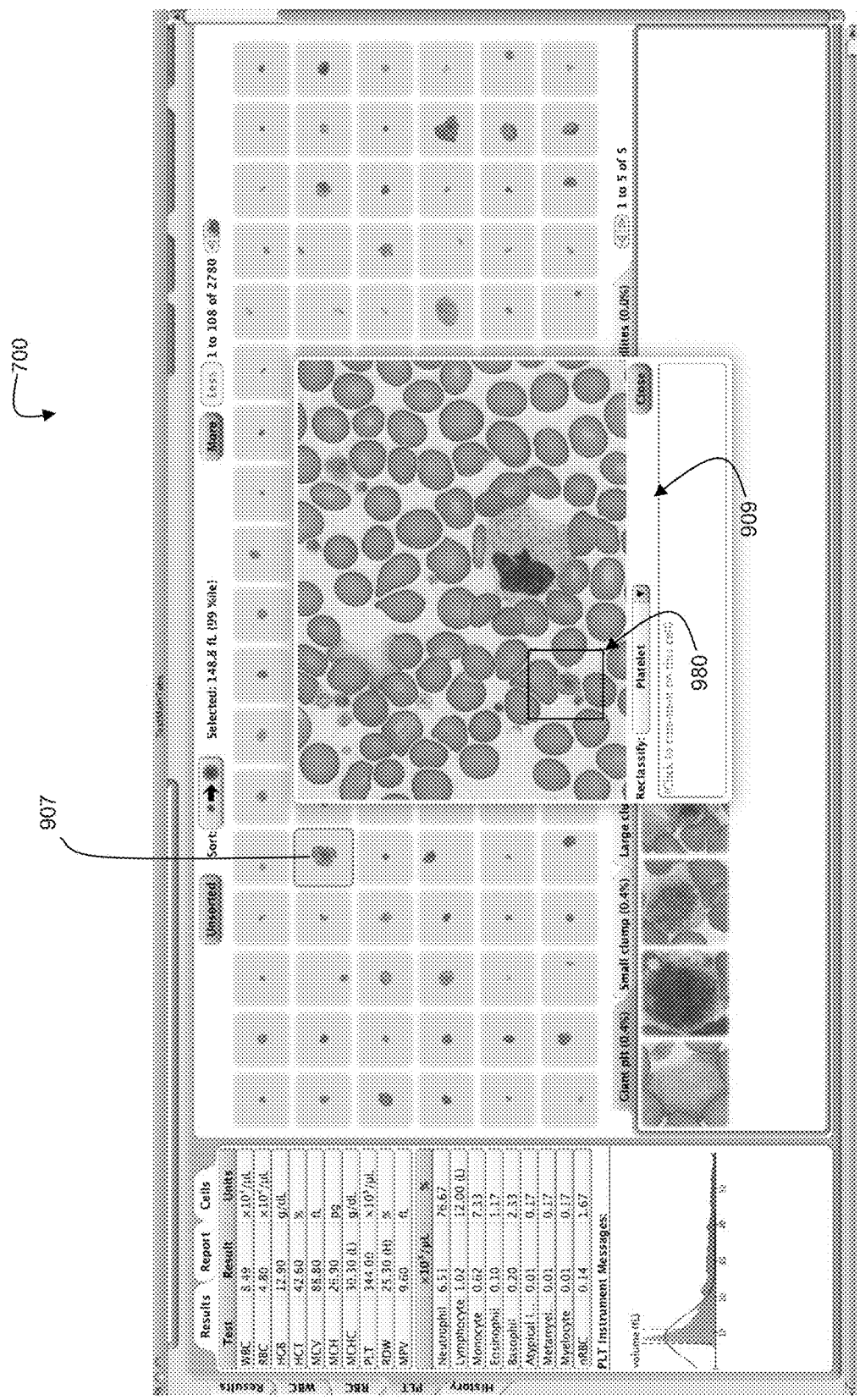

In some embodiments, when a particular platelet is selected, the interface 700 facilitates a visualization of the position of the selected platelet in a corresponding field of view. This is illustrated by an example in FIG. 14B. As shown in this example, when a particular platelet image 907 is selected, interface 700 can be configured to display a field of view image in a display box 909 where the position of the corresponding platelet is marked, for example, by a bounding box 980. The field of view image allows visualization of the particular platelet as imaged on the slide and provides information on blood constituents within a neighborhood of the particular platelet. The field of view visualization is not limited only to platelets and is, in general, available for red blood cells, white blood cells, or other blood constituents. In some embodiments, the display box 909 can also be configured to facilitate reclassification of the selected blood constituent. For example, if the automated classification system erroneously determines a monocyte as a lymphocyte, the display box 909 can facilitate a manual reclassification. Such reclassification can be performed in a substantially similar manner as describe below with reference to the example in FIG. 18A discussed subsequently.

In some embodiments, interface 700 includes a sampling display block in which cells having potentially anomalous values of one or more properties can be displayed for review by the technician. For example, interface 700 in FIG. 13A includes a sampling display block 919 in which a series of potentially abnormal or unusual cells are displayed. These potentially abnormal cells can correspond to immature reticulocytes, to cells with inclusions, to nucleated red blood cells, or to cells with values of parameters such as cell volume and/or cell hemoglobin concentration that exceed upper or lower threshold values. In FIG. 14A, identified platelets with sizes that are significantly larger than an upper threshold value are displayed in sampling display block 919. In general, sampling display block 919 can also be used to display images of cells (e.g., white blood cells) that cannot be automatically classified, allowing the technician to assign such cells to a particular class.

For certain applications, it can be important to display unusual cells for review by a system operator. Unusual cells can, for example, have shapes that are not round, have inclusions, have unusually-shaped or -positioned nuclei, have unexpected variations in optical density, and/or correspond to fragments of cells rather than complete cells. In some embodiments, some or all such cells are retained and displayed. For example, cells with non-circular shapes (e.g., cells for which a measure of circularity falls below a threshold value) can be displayed in image block 704. Such cells can also be displayed in sampling display block 919 for special review by the operator. While such cells may not be used for the measurement of certain properties (e.g., the properties shown in Table 1), it can be useful for an operator to view images of such cells for diagnostic purposes (e.g., to detect the presence of red blood cell fragments and/or inclusions). Thus, the set of cells displayed in sampling display block 919 may not, in general, correspond to the set of cells that are used to determine quantitative properties for a particular blood sample.

Figure 15:
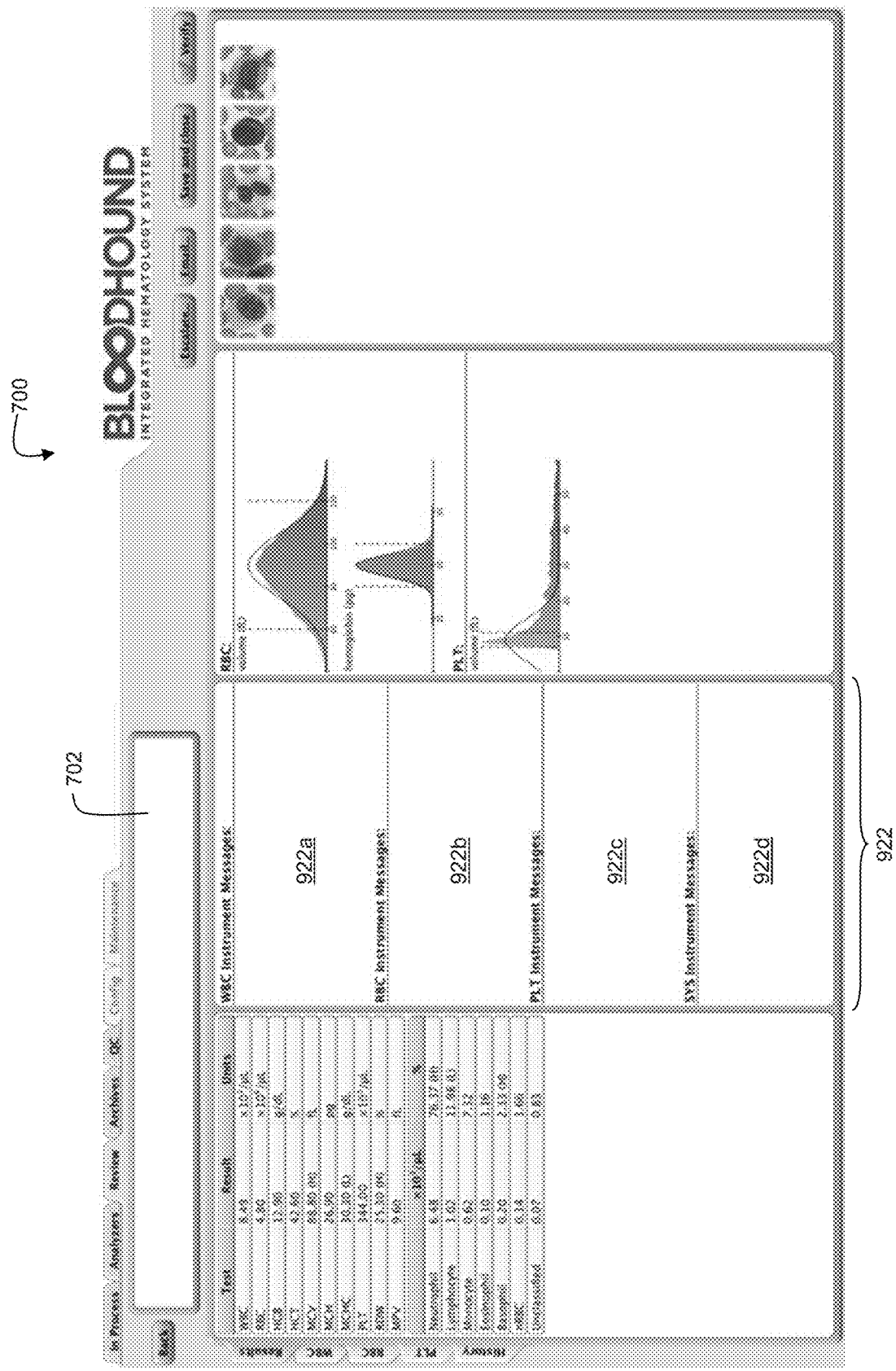
FIG. 15 is an image of a graphical user interface for display of red blood cell images that includes a message display block.

In certain embodiments, interface 700 can also include a message display block that can be populated automatically by the system when one or more anomalous conditions (e.g., such as one or more cells having a value of a property that exceeds an upper or lower threshold value) occurs. FIG. 15 shows an interface 700 that includes a message display block 922 (e.g., which can be displayed on a separate screen from the image block). Message display block 922 includes separate sub-blocks 922a, 922b, 922c, and 922d, for reporting messages relating to white blood cells (e.g., whether atypical or variant lymphocytes are present), red blood cells (e.g., whether inclusions are present), platelets (e.g., whether giant platelets are present), and the system (e.g., less than 25 samples of stain or other system consumables remaining), respectively. In general, messages displayed correspond to flagging conditions identified by the system. For example, with respect to red blood cells, a message can be displayed whenever one or more properties of the red blood cells—such as possible inclusions, unusual variation in cell shape, and/or unusual variations in cell size—are detected by the system. With respect to white blood cells, messages can be displayed to alert the technician whenever one or more of the white blood cell count, neutrophil count, lymphocyte count, monocyte count, eosinophil count, and/or basophil count exceeds an upper or lower threshold value.

Returning to FIG. 13A, in some embodiments, interface 700 includes controls 930 and 932 for selecting the number of cells that are displayed in the image block. When the technician increases the number of cells that are displayed by activating control 930, each of the cell images in the image block is scaled to a smaller size to accommodate the additional cell images in the image block. When the technician decreases the number of cells that are displayed by activating control 932, each of the cell images is scaled to a larger size to restrict the number of cells that are displayed. In this manner, the technician can control the size of the displayed cell images, and "scrolling through" the image block can be prevented (because the entire image block is displayed on a single screen). In general, sorting algorithms applied to the cell images are applied only to the subset of cell images that are displayed in the image block. An indicator provides the technician with information about the number of displayed cell images out of the total number of stored cell images for a particular sample.

Figure 16:
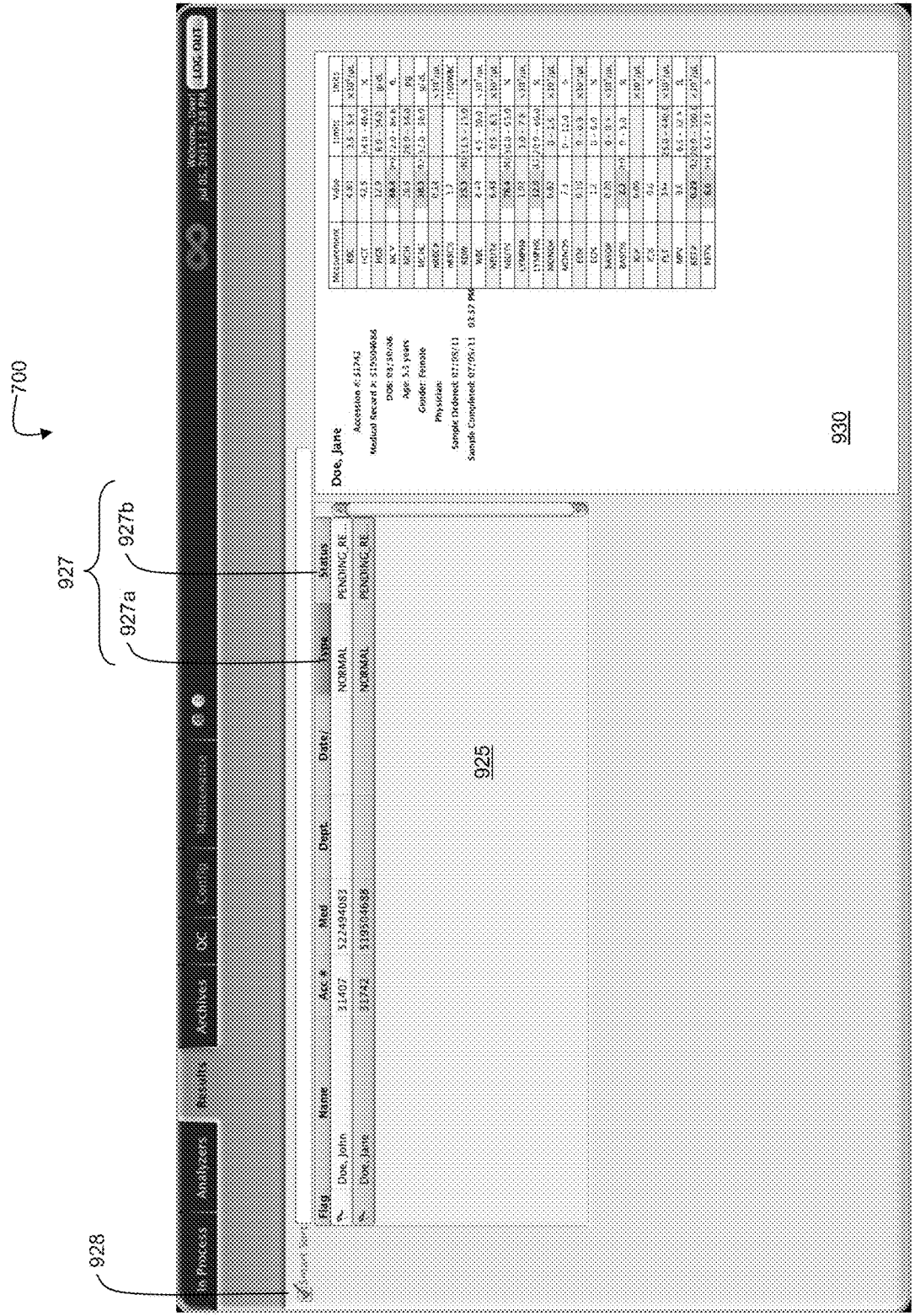
FIG. 16 is an image of a graphical user interface for display of patient records.

Referring to FIG. 16, in some embodiments, interface 700 includes a display box 925 for displaying patient records that include one or more attributes 927a, 927b (927, in general) related to the patients. Display box 925 can be configured to be displayed under a particular tab (e.g. the "Results" tab shown in FIG. 16) of the interface 700. Patient attributes 927 can include, for example, patient name, accession number, department, date, diagnosis, status, attending physician, or other attributes related to the patient. Numerical values or strings for the attributes can be stored as a database of patient records. The patient attributes can also include a flag that can be set or reset to indicate whether the corresponding record should be displayed. For example, the flag can be reset for patient records that do not show any abnormality in the corresponding blood images. Similarly, the flag can be set for patient records where at least one potentially abnormal cell is detected. In some cases, only the records for which the flag has been set are displayed in the display box 925.

In some embodiments, interface 700 includes a configurable sort control 928 that, when selected, allows sorting of the patient records based on user preferences. For example, a particular user (e.g. a pathologist or an oncologist) can be interested in displaying records for cancer patients. Similarly, another user may be more interested in the records for AIDS patients. In such cases, each user can personalize or configure sort control 928 to prioritize displaying of particular types of records. In some embodiments, several sets of user preferences can be stored and the set of preferences to be used can be determined based on detecting the user, for example using the log-in information.

In some embodiments, a database storing the patient records can be queried (e.g. over a range of values of one or more attributes) to display records of interest. For example, a user can query the database to display only the patient records where the mean cell volume is above or below a threshold. Similarly, another user can query the database to list records that have unclassified cells. The records retrieved using the query can be displayed in display box 925. Sort control 928 can be used in conjunction with the querying to further narrow the set of displayed results.

In some embodiments, a record listed in the display box 925 can be highlighted (for example by hovering a pointer on the record or clicking on the record once) to display additional information associated with the record. Such information can be displayed, for example, in auxiliary display box 930 within the interface 700. The additional information in display box 930 can include, for example, white blood cell count, red blood cell count, mean cell volume and other CBC results and attributes related to the selected record. The highlighted record can also be selected (for example by double clicking on the record) to provide access to detailed results and images through the interface 700 as described above with reference to FIG. 15. Results can be shown as an overview as well as separately for red blood cells, white blood cells and platelets using, for example, separate tabs as shown in FIG. 15.

Figure 17:
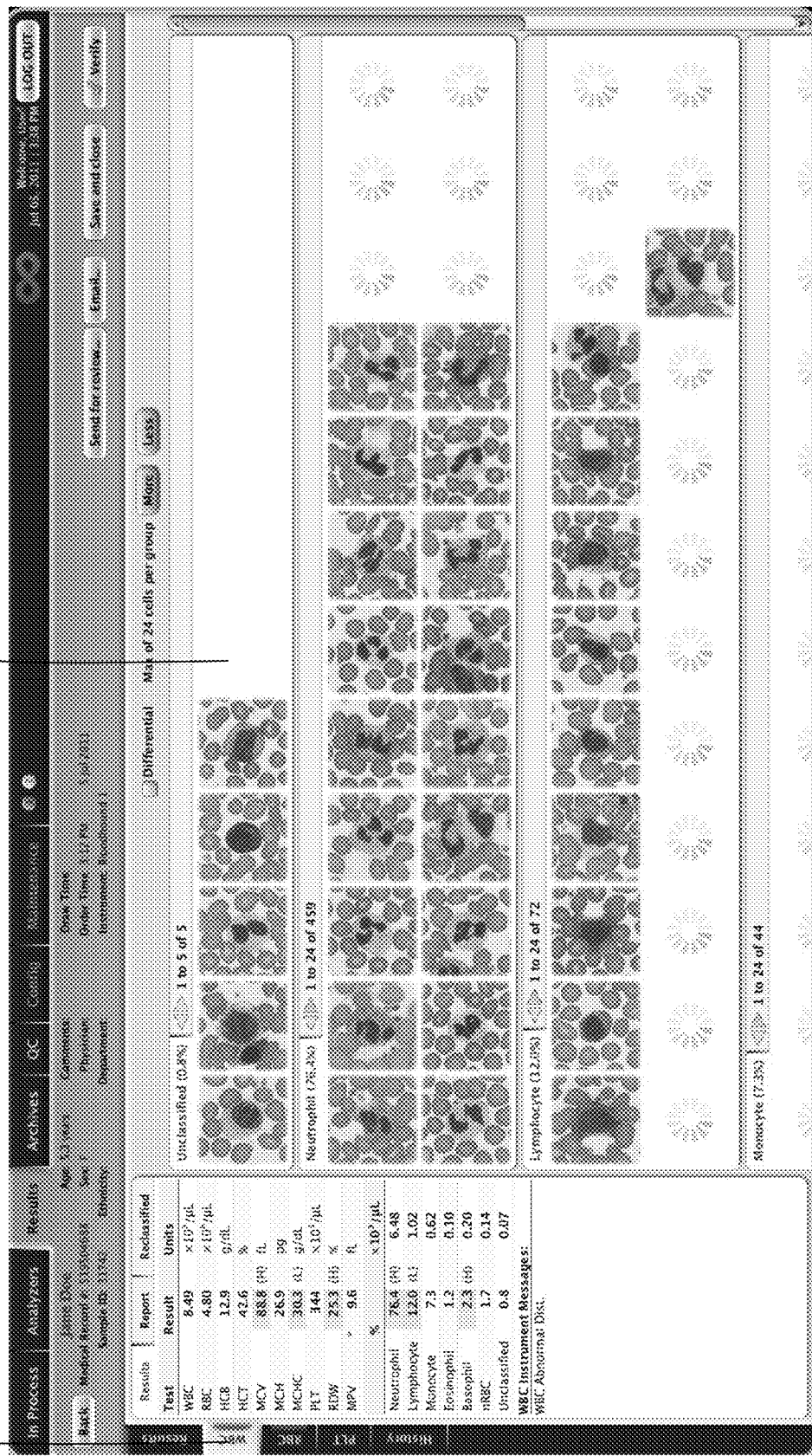
FIG. 17 is an image of a graphical user interface for display of blood constituent images.

FIG. 17 shows an exemplary graphical user interface 700 for display of blood constituent images. Selecting a particular tab can provide access to additional results and images associated with the tab. For example, in FIG. 17, when the white blood cells tab 935 is selected, differential results are provided as galleries of images classified by cell types with any unclassified cells shown individually in display window 940.

Figure 18A:
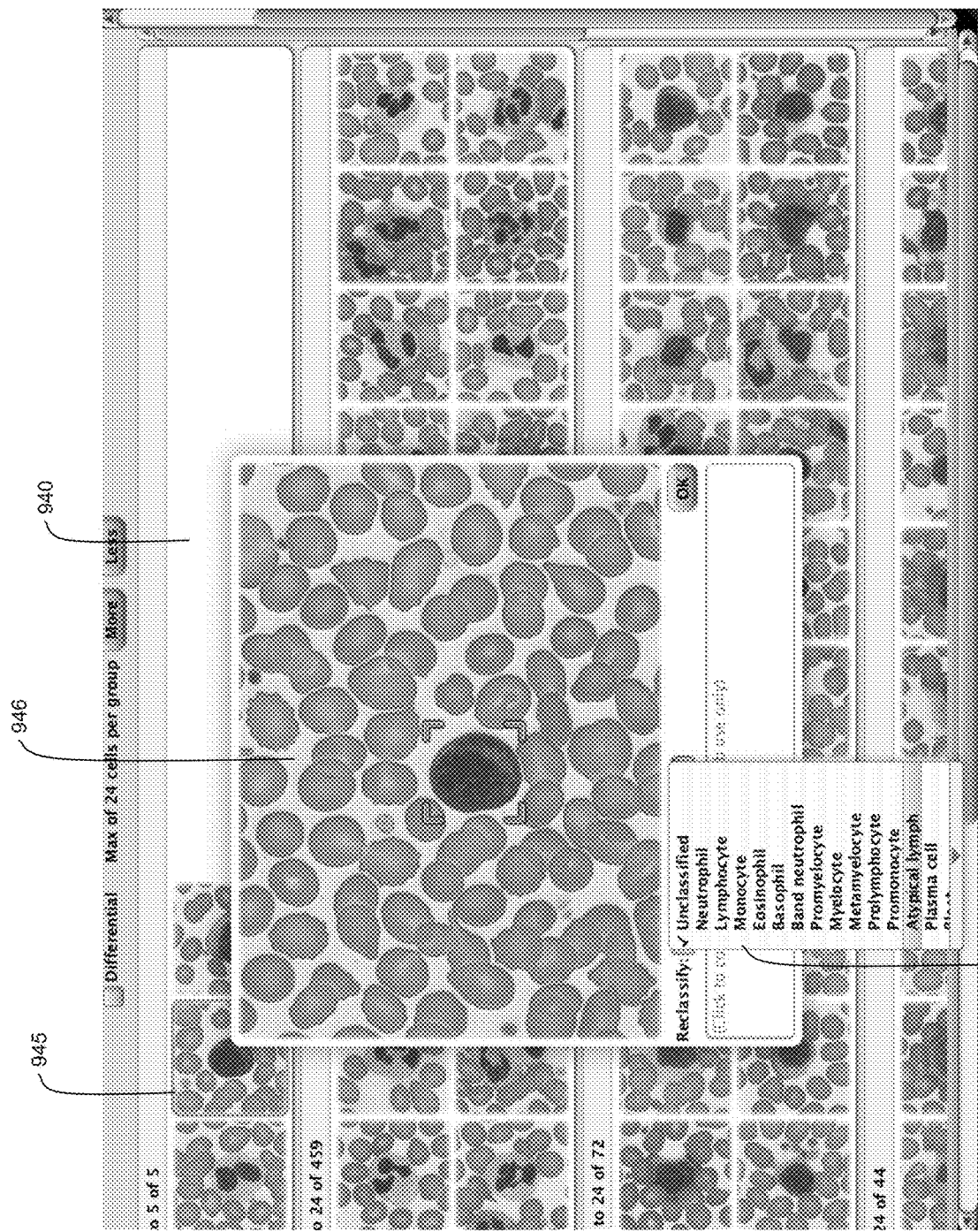
FIGS. 18A-18C are images of graphical user interfaces for display and manual classification of cell images.
Figure 18B:
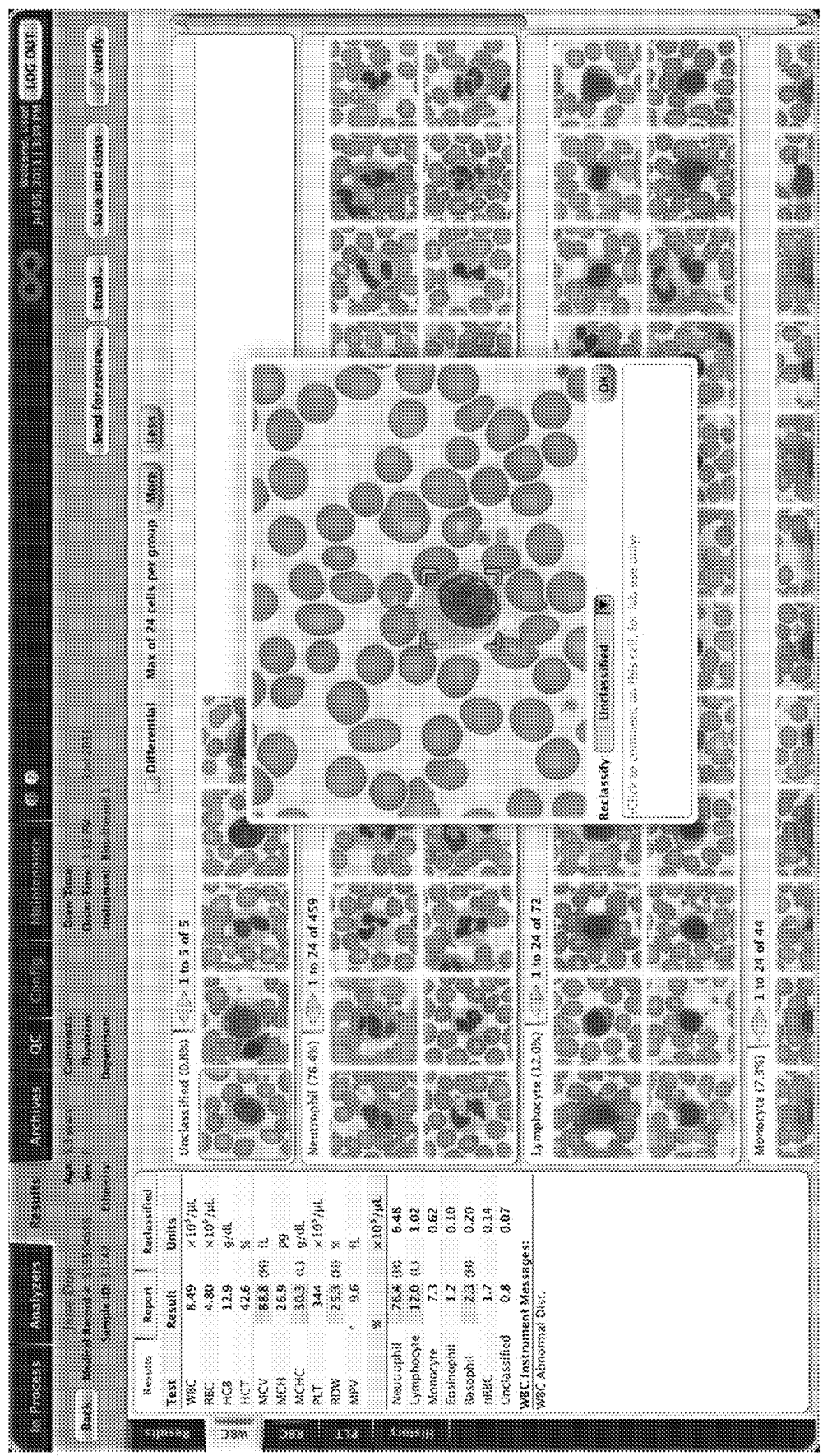

In some embodiments, the unclassified cells, platelets or other blood constituents can be reviewed by an operator and manually classified or reclassified. In some cases, erroneous classification of blood constituents can be fixed by manual reclassification. An example of such manual classification or reclassification of blood constituents is shown in FIG. 18A. In some embodiments, an image 945 of an unclassified cell is selected from the display box 940. Selection of the image 945 causes a pop up display 946 of the image 945 to be displayed. The pop-up display 946 of the image 945 allows for better visualization of the unclassified cell. In some embodiments, a set of pre-defined cell types are also displayed in a drop down menu box 950 that allows selection of at least one of the pre-defined cell types. When a cell type is selected from the drop down menu box 950, the cell depicted in image 945 is classified or reclassified according to the selected cell type. In some embodiments, the items in the drop down menu are user configurable to account for, for example, lab-to-lab or region-to-region differences in ways that technologists or clinicians identify or classify cells. Once a cell type is selected, the enlarged version of the selected image shows the newly selected cell type as illustrated in FIG. 18B. In addition, reclassified images can be displayed by selecting a separate tab control (e.g., the "Reclassified" tab control in FIG. 18B) where, for each image reclassified, the initial and reclassified cell types are displayed. Further, two or more cells can be reclassified simultaneously. As shown in FIG. 18A, the two images adjacent to and in the same row as image 945 may be selected as a group, and the drop menu box 950 can be used to reclassify the cells within the group of three selected images as a single cell type.

Figure 18C:
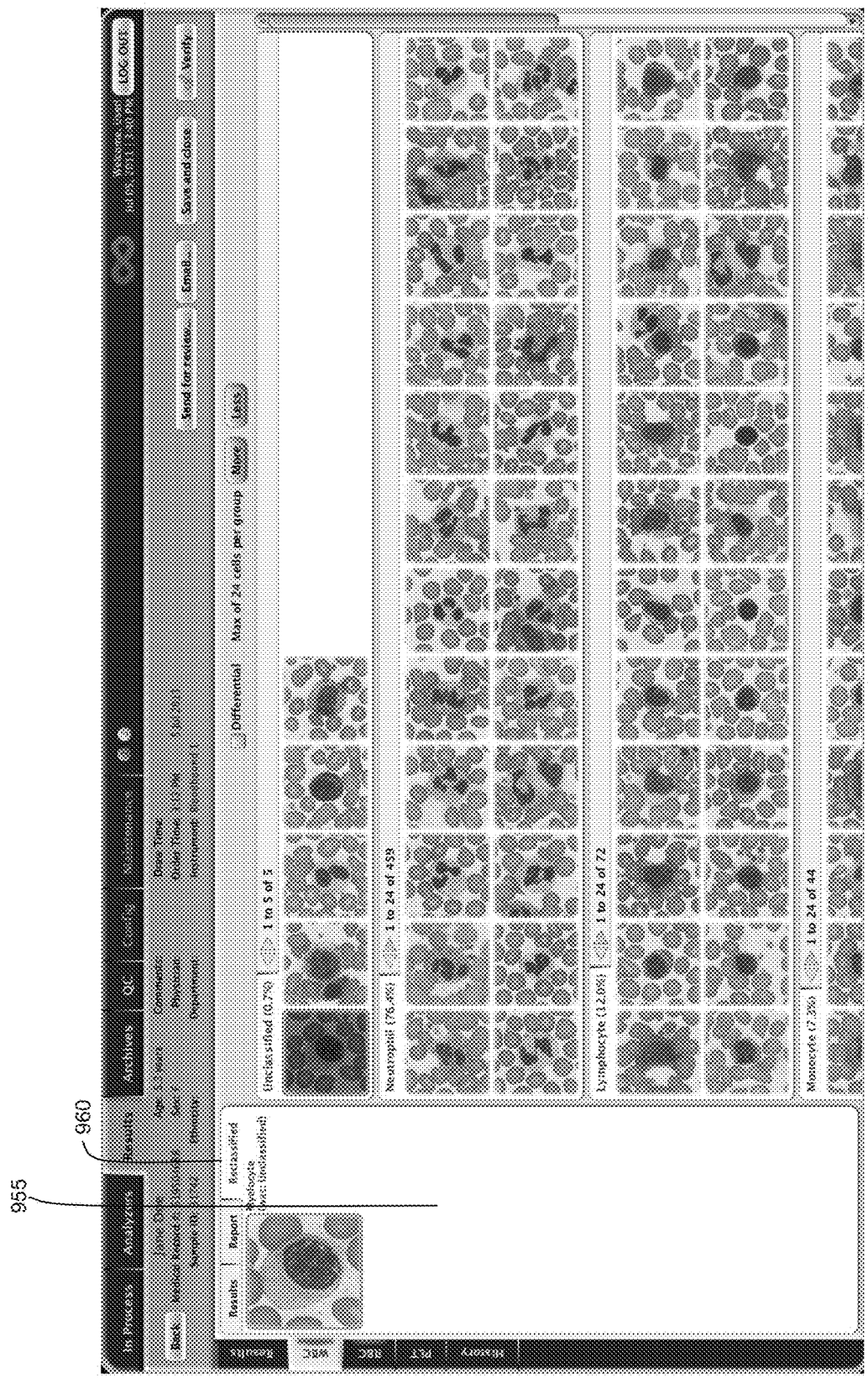

In some embodiments, image 945 is then moved to an appropriate display box corresponding to the selected cell type. Image 945 can either be removed from the display box 940 or suitably marked (for example by converting from a color image to a grayscale image) to indicate that the image has been classified (or reclassified). In some embodiments, the classified or reclassified images are slightly darkened as well as moved to a display region 955 under a "Reclassified" tab 960 in FIG. 18C. In some embodiments, a user can input a description for image 945 either in place of, or in addition to, selecting a cell type from the pre-defined set in drop down menu box 950. The manual classification functionality can also be made available for automatically classified images. If the automatic classification for any image is incorrect, the image can then be manually classified. In some embodiments, manually classified or reclassified images can be used as additional training data used for the automatic classification process.

In certain embodiments, multiple images can be classified or reclassified together. For example, multiple images can be selected from display box 940, and the selected images can be displayed as an ensemble of smaller images in pop-up display 946. The selected images can be viewed individually, for example, by scrolling or flipping through the ensemble. When multiple images are selected, the entire ensemble can be classified or reclassified by selecting a cell type from the drop down menu box 950 only once.

Automated Systems and Methods for Sample Imaging

FIG. 1 shows a schematic diagram of an automated system 1000 for preparing and examining blood samples, including performing a CBC analysis. System 1000 includes multiple sub-systems for storing substrates, depositing samples on substrates, inspecting samples prepared on substrates, and storing prepared samples.

Substrate storage sub-system 1010 is configured to store substrates prior to the deposition of samples thereon. Substrates can include, for example, microscope slides, coverslips, and similar planar, optically transparent materials capable of supporting a sample such as, for example, cells from a sample of blood. The substrates can be formed from a variety of different amorphous or crystalline materials including various types of glasses. Sub-system 1010 can include a manipulator that selects individual substrates from a storage container and transfers the selected substrates to sample deposition sub-system 1020.

Sample deposition sub-system 1020 deposits a selected quantity of a sample of interest—such as a blood sample—onto a substrate. Sub-system 1020 includes, in general, a variety of fluid transfer components (e.g., pumps, fluid tubes, valves) configured to deposit the sample. Sub-system 1020 also includes fluid transfer components that expose the substrate to solutions of various types, including wash solutions, one or more stains that bind to the sample, fixing solutions, and rinse solutions. Sub-system 1020 can also feature fluid removal components (e.g., a vacuum sub-system) and a drying apparatus to ensure that the sample is fixed to the substrate. A substrate manipulator can transfer the substrate supporting the sample to inspection sub-system 1030.

Inspection sub-system 1030 includes various components for obtaining images of samples on substrates, and for analyzing the images to determine information about the samples. For example, inspection sub-system 1030 can include one or more light sources (e.g., lamps, arc lamps, light emitting diodes, laser diodes, and/or lasers) for directing incident light to a sample. Imaging sub-system 1030 can also include an optical apparatus (e.g., a microscope objective) for capturing transmitted and/or reflected light from a sample. A detector (e.g., a CCD detector) coupled to the optical apparatus can be configured to capture images of the sample. Information derived from analysis of the images of the sample can be stored on a variety of optical and/or electronic storage media for later retrieval and/or further analysis.

Following inspection, a substrate manipulator can transfer the substrate to storage sub-system 1040. Storage sub-system 1040 can label individual substrates, for example, with information relating to the source of the sample applied to the substrate, the time of analysis, and/or any irregularities identified during analysis. Storage sub-system can also store processed substrates in multi-substrate racks, which can be removed from system 1000 as they are filled with substrates.

As shown in FIG. 1, each of the various sub-systems of system 1000 can be linked to a common electronic processor 114. Processor 114 can be configured to control the operation of each of the sub-systems of system 1000 in automated fashion, with relatively little (or no) input from a system operator. Results from the analysis of samples can be displayed on system display interface 110 for a supervising technician. Control interface 112 (which in some embodiments can be integrated with display interface 110) permits the technician to issue commands to system 1000 and to manually review the automated analysis results.

Additional aspects and features of automated sample processing systems are disclosed, for example, in U.S. patent application Ser. No. 12/430,885, filed on Apr. 27, 2009, and U.S. patent application Ser. No. 13/293,050, filed on Nov. 9, 2011, the entire contents of each of which are incorporated herein by reference.

When multiple blood samples are analyzed automatically by system 1000, the system can generate a list of samples that merit further review by a technician. Samples can be flagged for further review based on a number of criteria. In some embodiments, system 1000 can be configured to identify various types of cells present in an individual blood sample, and the sample can be flagged for further analysis when the counted number of one or more of the various types of identified cells is either above or below a certain threshold number. For example, a sample can be flagged for further analysis if one or more of its lymphocyte count, monocyte count, neutrophil count, band neutrophil count, eosinophil count, basophil count, and/or red blood cell count exceeds or falls below a particular threshold value.

In certain embodiments, the sample can be flagged if one or more properties associated with the sample fall either above or below a certain threshold value. For example, system 1000 can be configured to measure various properties associated with the sample, including mean cell hemoglobin, mean cell volume, and hematocrit. If the values of any one or more of these measured sample properties exceeds or falls below a particular threshold value, the sample can be flagged. Methods and systems for measuring mean cell hemoglobin, mean cell volume, and mean platelet volume are disclosed, for example, in the following applications, the entire contents of each of which are incorporated herein by reference: U.S. Provisional Patent Applications 61/476,179 and 61/476,170, both filed on Apr. 15, 2011; U.S. Provisional Patent Applications 61/510,710 and 65/510,614, both filed on Jul. 22, 2011; and U.S. patent application Ser. Nos. 13/446,967, 13/446,996, and 13/447,045, each filed on Apr. 13, 2012.

Once a sample has been flagged, system 1000 is configured to perform a series of automated steps to permit systematic visual inspection and assessment of the sample by a technician. The following exemplary description focuses on the review of red blood cells within a sample that has been flagged for further analysis. However, it should generally be understood that the systems and methods disclosed herein can be used for detailed inspection of a variety of different constituents within a blood sample, including white blood cells and/or platelets for example. Moreover, the systems and methods can be used for inspection of samples that have not been flagged (e.g., samples that have been determined to be "normal" according to various established criteria).

Figure 2:
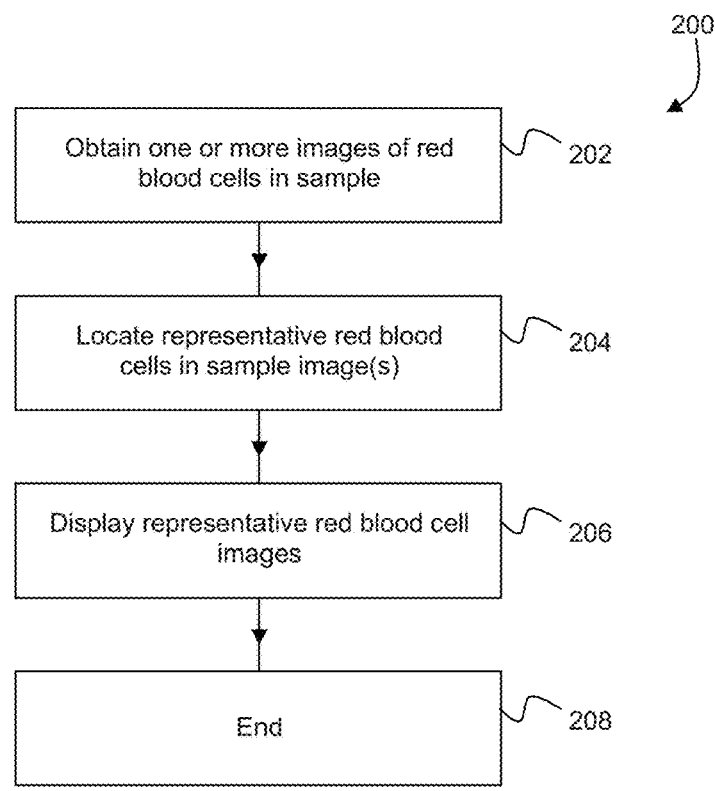
FIG. 2 is a flow chart showing a series of steps for obtaining and displaying images of red blood cells.

System 1000 is generally configured to perform a series of steps in order to obtain and organize images of red blood cells for review by a technician. FIG. 2 shows a flow chart 200 that includes a series of steps performed by system 1000 to obtain and display images of red blood cells. In a first step 202, system 1000 obtains one or more images of red blood cells in the sample. Red blood cells are typically prepared (as part of a sample) by applying a stain to the cells. The stain binds to the cell cytoplasm and serves as a marker for the cytoplasm in cell images. When a stained cell is illuminated with incident light, the stain absorbs a portion of the incident light. By detecting light transmitted through various regions of a sample (some of which correspond to stained red blood cells and some of which do not), the red blood cells can be readily identified.

Figure 3:
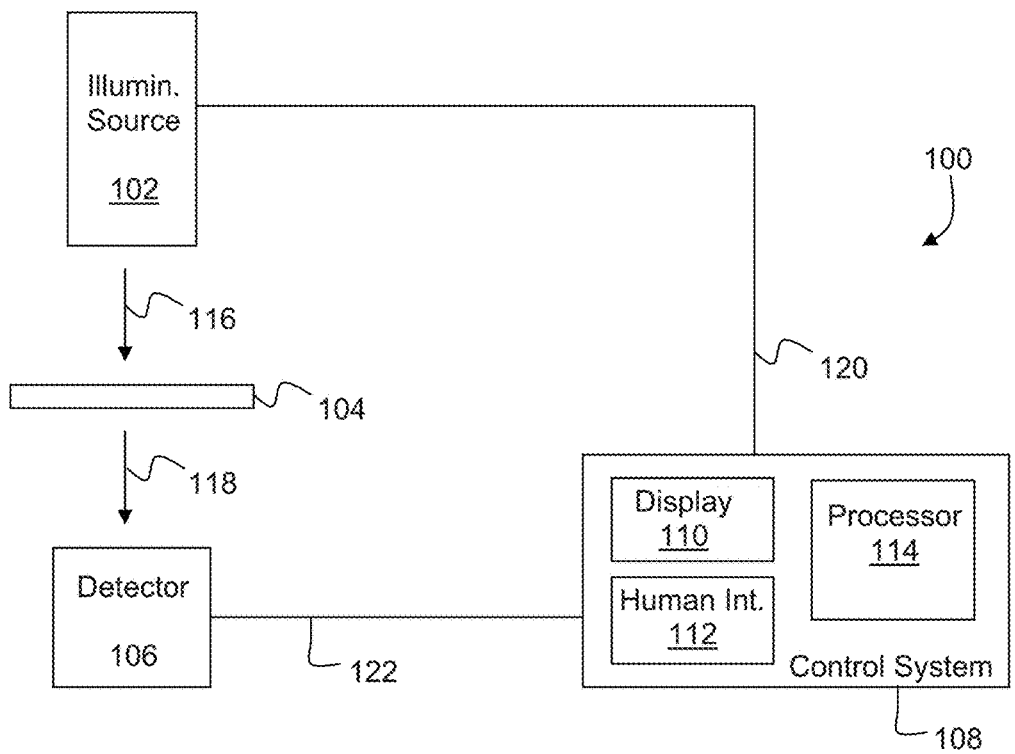
FIG. 3 is a schematic diagram of a sample inspection and analysis system.

Inspection sub-system 1030 of system 1000 is configured to obtain the images of the red blood cells in the sample. FIG. 3 shows a schematic diagram of an embodiment of inspection sub-system 1030. Sub-system 1030 includes an illumination source 102, a detector 106, and an electronic control system 108. Electronic control system 108 typically includes electronic processor 114, display 110, and interface 112 (that is, the various components of sub-system 1030 are connected to electronic processor 114 of system 1000). Alternatively, in some embodiments, inspection sub-system 1030 can include one or more of a processor, a display, and an interface that is/are separate from the corresponding components of system 1000. Electronic control system 108 is connected to illumination source 102 and to detector 106 via control lines 120 and 122, respectively.

Assuming that a sample has been prepared by applying stain to the red blood cells therein, the prepared sample 104 (e.g., a stained blood sample on a microscope slide) is positioned automatically in proximity to source 102. Source 102 directs incident light 116 toward sample 104. A portion of the incident light passes through sample 104 as transmitted light 118 and is detected by detector 106. Transmitted light 118 forms an image of sample 104 on the active surface of detector 106; the detector captures the image, and then transmits the image information to electronic control system 108. In general, electronic control system 108 directs source 102 to produce incident light 116, and also directs detector 106 to detect the image of sample 104.

The process discussed above can be repeated to obtain multiple images of sample 104 (e.g., corresponding to multiple different regions of sample 104) if desired. However, the methods disclosed herein can operate using information derived from only a single sample image. Electronic control system 108 can adjust the wavelength of incident light 116 produced by source 102 prior to acquiring a new image. As such, the multiple images of sample 104 can correspond to different wavelengths of incident light 116 and therefore, different wavelengths of transmitted light 118.

Illumination source 102 can include one source or a plurality of the same or different sources. In some embodiments, source 102 can include multiple light emitting elements such as diodes (LEDs), laser diodes, fluorescent lamps, incandescent lamps, and/or flashlamps. For example, source 102 can include four LEDs having output wavelengths in the red, yellow, green, and blue regions of the electromagnetic spectrum, respectively (e.g., 635, 598, 525, and 415 nm). In certain embodiments, source 102 can include one or more laser sources. Instead of having multiple light emitters, in other embodiments, source 102 can include a single broadband emitter than can be configured to alter its output wavelength (e.g., under the control of electronic control system 108). For example, source 102 can include a broadband source (e.g., a laser source, or a white-light-emitting LED source) coupled to a configurable filter system (e.g., a plurality of mechanically adjustable filters, and/or a liquid-crystal-based electronically-adjustable filter) that produces a variable output spectrum under the control of system 108. In general, source 102 does not output illumination light 116 at a single wavelength, but in a band of wavelengths centered around a central wavelength (e.g., the wavelength of maximum intensity in the band). When the discussion herein refers to the wavelength of illumination light 116, this reference is to the central wavelength of the illumination band.

Detector 106 can include a variety of different types of detectors. In some embodiments, detector 106 includes a charge-coupled device (CCD). In certain embodiments, detector 106 can include photodiodes (e.g., a two-dimensional photodiode array). In some embodiments, detector 106 can include other light-sensitive elements such as CMOS-based sensors and/or photomultipliers. Detector 106 can also include one or more filtering elements, as described above in connection with source 102. In some embodiments, sample images corresponding to different wavelengths are obtained by illuminating sample 104 with illumination light 116 having a relatively broad distribution of wavelengths, and then filtering transmitted light 118 to select only a portion of the transmitted light corresponding to a small band of the wavelengths. Filtering can be performed on either or both the illumination side (e.g., in source 102) and the detection side (e.g., in detector 106) to ensure that images obtained using detector 106 each correspond to a specific distribution of light wavelengths with a particular central wavelength.

In certain embodiments, a broadband illumination source can be used together with a color camera (e.g., a camera configured to measure light in three different wavelength bands, such as red, green, and blue bands) to obtain sample images at multiple different wavelengths. The images corresponding to the different wavelength bands can be used separately or in combination in the methods disclosed herein.

In some embodiments, electronic processor 108 can be configured to convert pixel intensity values in the measured sample image(s) to optical density values. In the sample image(s), the transmitted light intensity T(x,y) at a given image pixel (x,y) is related to the absorption coefficient α and the path length ε(x,y) of the incident light through the portion of the sample corresponding to that pixel:

$$T(x,y)=10^{-\alpha\varepsilon(x,y)}$$

For each pixel in an image, the ratio of the pixel intensity to the maximum possible pixel intensity (e.g., pixel intensity/255 at 8-bit resolution) represents the fraction of light transmitted at the spatial location of the pixel. The fraction of transmitted light can be expressed in optical density (OD) units by taking the logarithm of the above equation:

$$OD(x,y)=-\log(T)=\alpha\cdot\varepsilon(x,y)$$

This process can be repeated for each pixel in the sample image. In this way, the optical density at each pixel in each image corresponds to the total amount (e.g., the product of the absorption coefficient and the thickness) of absorbing material in the sample at the location corresponding to the pixel.

Figure 4:
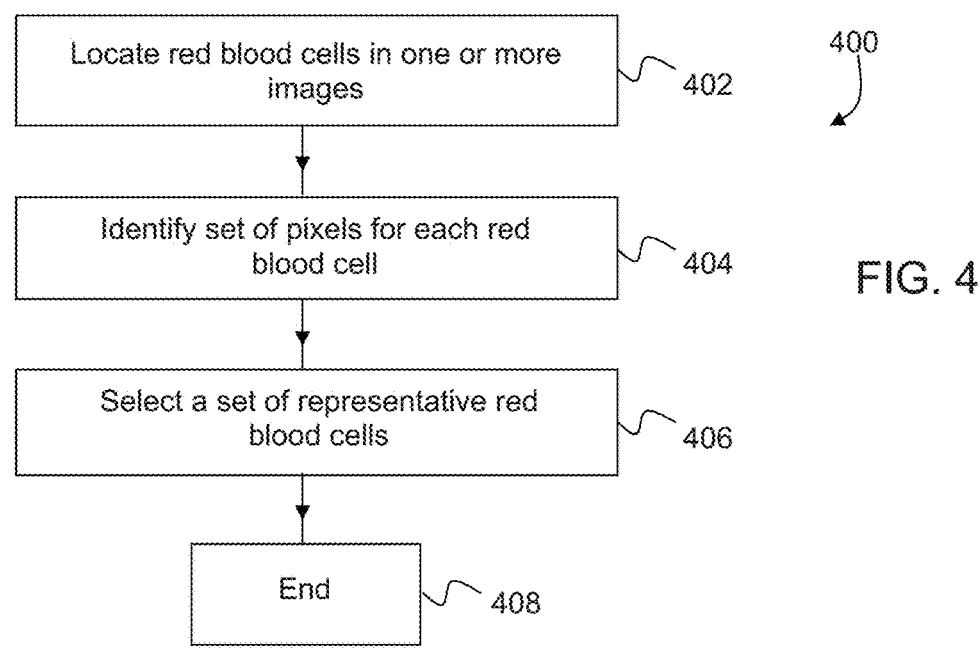
FIG. 4 is a flow chart showing a series of steps for locating and selecting red blood cells in a sample image.

Returning to FIG. 2, the next step 204 in flow chart 200 includes locating representative red blood cells in the sample image(s) obtained in step 202. The process of locating representative red blood cells typically proceeds according to a series of steps. FIG. 4 shows a flow chart 400 that includes multiple steps for locating red blood cells in a sample image. First, in step 402 of FIG. 4, system 1000 locates red blood cells in one or more sample images for further processing. Red blood cells typically absorb blue light (e.g., 415 nm) due to the presence of hemoglobin in the cells. White blood cells, however, do not contain hemoglobin and therefore do not absorb blue light in the same manner as red blood cells. An image of the sample acquired under blue light can be used to identify red blood cells; in such an image, red blood cells appear as dark objects, whereas white blood cells appear as significantly fainter objects, and can be excluded from further consideration.

In some embodiments, a thresholding step can be used to ensure that system 1000 identifies only red blood cells for further analysis. For example, system 1000 can utilize only image pixels below an intensity (or gray) value of 160 (for images captured at 8-bit resolution). Other intensity value thresholds ranging from 100 to 180 can be used to identify red blood cells from the image, while excluding white blood cells from further analysis.

Next, in step 404, system 1000 identifies a set of pixels for each red blood cell in the sample image. A variety of different methods can be used to identify sets of pixels associated with the cells. For example, in some embodiments, system 1000 performs the identification step using a connected components labeling process. This process correlates individual pixels from the sample image to an object in the image. For example, any two pixels in the image not separated by a pixel assigned to the background are assigned to the same cell.

In addition, in some embodiments, system 1000 can exclude pixels positioned within a border region of a cell. Typically, such exclusions are used when calculating quantitative metrics relating to the cell, but the excluded pixels are otherwise retained within the set of pixels corresponding to the cell for purposes of image display. In some embodiments, however, the excluded pixels are purged from the set of pixels corresponding to the cell.

Red blood cells often have thick, dark borders due to the manner in which these cells refract illumination light. Optical densities for these pixels are typically unreliable due to this refraction. After completing the connected components labeling process, system 1000 can apply a pixel erosion mask to the identified cells to remove the outermost n layers of pixels (e.g., the pixel(s) that correspond to the boundary region where refraction is greatest). In general, the pixel erosion mask can be selected to remove any number n of pixel layers (e.g., one pixel layer or more, two pixel layers or more, three pixel layers or more, four pixel layers or more, five pixel layers or more, six pixel layers or more, eight pixel layers or more, ten pixel layers or more) depending on the magnification of the image. It has been determined experimentally that a pixel erosion mask comprising the outermost 0.5 µm for the red cell perimeter is generally suitable for significantly reducing erroneous contributions to the measurement of cell volume and hemoglobin content for red blood cells where each pixel corresponds to a portion of the cell that is 0.148 µm×0.148 µm. Utilizing the sets of pixels corrected by erosion masks, various cell features can be measured.

In step 406, system 1000 continues the process of identifying a set of representative red blood cells from the sample image(s) by assessing the size and shape of red blood cells. In general, step 406 functions to discard partial cells, overlapping cells, cell clusters, platelets, and non-cellular artifacts from inclusion in the set of representative red blood cells. For example, cells that are either cut off by, or touching, the edge of the image frame can be excluded from further analysis, thereby preventing inaccurate measurements. In addition, misshapen cells—which can exhibit variations in the determined cell volume that are related to their non-standard shapes—can be excluded from the analysis. Further, measurement results obtained from overlapping cells, which can be unreliable when used for calculating metrics such as cell volumes or constituent content, can be precluded from the set of representative cells. For these reasons, the shapes of each of the identified cells are checked in step 406, and misshapen and/or overlapping cells are excluded from further analysis.

Figure 5:
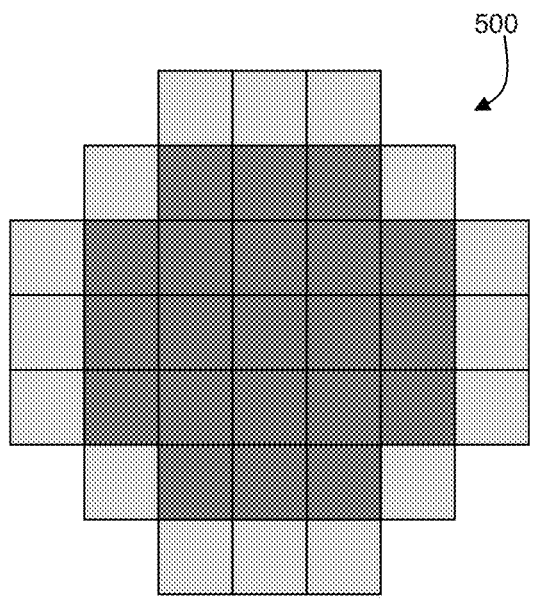
FIG. 5 is a schematic image of a cell showing the cell boundary.

A variety of different methods can be used to check the shape of the identified cells. For example, in some embodiments, the shape of each cell can be checked by comparing the perimeter and the area of the cell. FIG. 5 shows a schematic diagram of such a comparison. In FIG. 5, a cell 500 has been identified as a set of pixels in a sample image. The pixels corresponding to the boundary of cell 500 are shaded lighter in FIG. 5 than the interior pixels for purposes of demonstration—they do not necessarily appear this way in the actual image. The area of cell 500 can be determined by counting the number of pixels in the set.

The cell perimeter is determined from the boundary pixels using the set of pixels corresponding to cell 500. This can be accomplished by connecting a line through the center of each perimeter pixel to create a polygon in the image and measuring the perimeter of the polygon. The ratio of this cell perimeter value squared to the cell area value (i.e., the area of the polygon) is determined to check the shape of the cell. The value of this ratio is 471 for an ideal, perfectly circular cell. The value of the ratio increases as the cell shape departs from a circular outline. Using this criterion, cells with a ratio of the perimeter squared to the area, which exceeds the minimum value of 47 by a threshold amount or more, are excluded from further analysis. Typically, the threshold amount is a percentage of the minimum value of 47 (e.g., 5% or more, 10% or more, 15% or more, 20% or more, 25% or more).

In addition to excluding misshapen individual cells from further analysis, the procedure discussed above can also exclude overlapping cells. In sample images, overlapping cells typically appear as large, misshapen individual cells (with variations in transmitted light intensity due to the increased thickness of material through which the incident light propagates). Overlapping cells are generally identified as large single cells with irregular boundaries when analysis algorithms are applied to such images. As such, when the comparison of the cell perimeter and area is performed, the ratio falls well beyond the threshold for allowable variance from the ideal value, and the overlapping cells are excluded.

Figure 6:
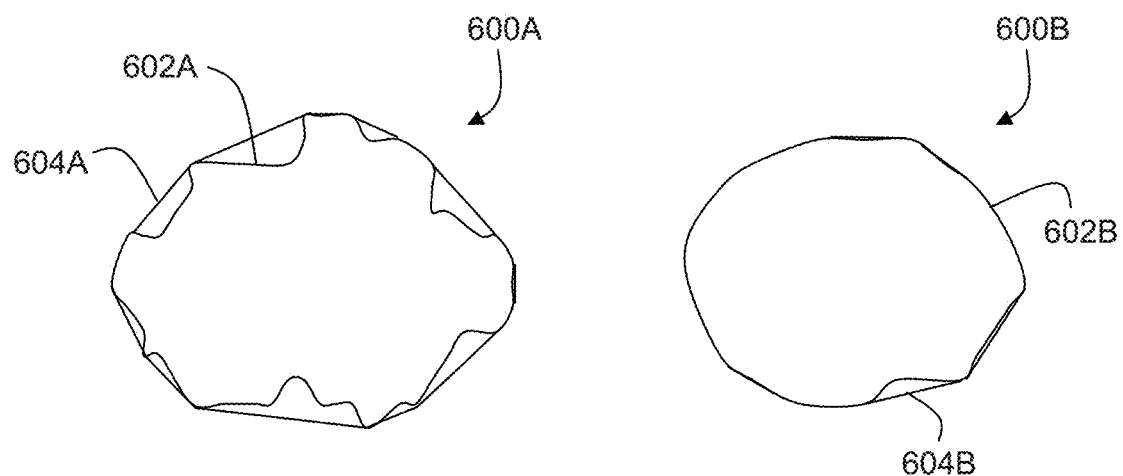
FIG. 6 is a schematic diagram showing two cells and convex hulls determined for each of the cells.

Another method for checking the shape of identified cells utilizes the convex hull of the polygonal representation of the cell outline described above and compares the area enclosed by the convex hull to the cell area determined from the image pixels. A high ratio of convex hull area to cell area can be used to identify irregularly shaped cells and exclude such cells from further analysis. FIG. 6 is a schematic diagram that includes two cells 600A and 600B. The perimeters of cells 600A and 600B are marked as 602A and 602B, respectively, in FIG. 6. A convex hull 604A is drawn around cell 600A, and a convex hull 604B is drawn around cell 600B. As shown in FIG. 6, the discrepancy between the convex hull area and the cell area is greater for cell 600A than for cell 600B. Given the high degree of irregularity for cell 600A, cell 600A can be excluded from the set of representative red blood cells.

In some embodiments, cell area measurements can be used in step 406 to exclude artifacts and overlapping cells from the set of representative blood cells. For example, only cells with an area ranging from 35 square microns to 65 square microns can be considered for red blood cell volume measurements. Imaged objects with an area less than 35 square microns are typically not red blood cells, but artifacts, such as a speck of dust in the sample. Similarly, imaged objects with an area greater than 65 square microns are typically not red blood cells; such object might correspond to a blob of stain or to several overlapping cells. While the foregoing example describes a 35 to 65 square micron area range, other ranges can be used to select red blood cells for measurement (e.g., 20 square microns to 80 square microns), and the range can be scaled based on the average cell size in the sample, thereby accounting for patient-to-patient variability. It has been determined experimentally that while the 35-to-65 square micron range can exclude some red blood cells, such range is more effective at removing artifacts from the sample image as compared to the 20-to-80 square micron range.

Optical density values can be used to select the set of representative red blood cells in the sample. For example, if the mean optical density value of an object imaged under blue light is too low, the object may be a white blood cell nucleus instead of a red blood cell. A mean optical density threshold can be used (e.g., mean optical density less than or equal to 0.33) for images acquired using blue light to exclude white blood cells from the set of representative red blood cells for the sample (e.g., a cell with a mean optical density less than or equal to 0.33 is likely to be a white blood cell). For images acquired under blue or yellow illumination, a mean optical density value for an object exceeding a certain threshold (e.g., mean optical density greater than or equal to 0.66) can be used to identify stacked, overlapping, and/or clustered red blood cells, which can be excluded from further analysis (e.g., a red blood cell with a mean optical density greater than or equal to 0.66 is likely to be overlapping another red blood cell). The process shown in FIG. 4 terminates at step 408 with the final determination of a set of representative cells for further analysis.

Returning to FIG. 2, after the representative red blood cells are located in step 204, the representative cells are displayed to a technician on display 110 in step 206. In some embodiments, all such cells are displayed. In certain embodiments, only a subset of the cells located in step 204 are displayed. The subset of cells that are displayed can be selected at random, and the number of cells in the subset is user-selectable. For example, the subset of representative cells displayed can include 100 cells or more (e.g., 250 cells or more, 500 cells or more, 750 cells or more, 1000 cells or more, 2000 cells or more, 5000 cells or more, 10,000 cells or more). Following display of the representative red blood cell images in step 206, the procedure shown in flow chart 200 terminates at step 208.

As discussed above, in some embodiments, the subset of representative cells that are displayed in step 206 does not necessarily correspond to the set of representative cells that are used to determine quantitative metrics for the blood sample. In particular, it can be important to display for the technician cells that have abnormal shapes, optical densities, inclusions, and other irregular attributes. Although such cells are typically not used in quantitative determinations such as the calculation of mean cell hemoglobin and mean cell volume, a technician viewing images of such irregular cells can infer the presence of certain conditions in a blood sample from irregular cells. As such, while cells that are unsuitable for use in quantitative calculations can be determined using the methods disclosed above, in certain embodiments the subset of cells that are displayed in step 206 includes some or all of these "unsuitable" cells.

As discussed previously, cell images in image block 704 can be sorted according to a variety of criteria, including the presence or absence of inclusions in the cell and properties of the inclusion such as size. Inclusion detection can be performed at the same time that the cell images are analyzed to determine size, optical density, and other properties of the cells (e.g., in step 406 of FIG. 4).

Various methods can be used to detect the presence of inclusions in a cell once a set of pixels corresponding to the cell has been identified. For example, a first method identifies possible inclusions based on the optical density of pixels in the cell image. In particular, each pixel in a red blood cell image is segmented into one of three classes: normal red blood cell, central pallor, and possible inclusion. Pixels corresponding to the normal portion of the red blood cell can be identified in relatively straightforward fashion because these pixels have been observed experimentally to have a narrow range of optical densities. Accordingly, by establishing upper and lower thresholds for normal red blood cell pixels, these pixels can be identified in the cell image. Such thresholds can be determined, for example, from a training set of data containing images of normal red blood cells.

The remaining pixels in the image correspond to either the central pallor or to possible inclusions. In general, pixels with low optical densities correspond to the central pallor, while pixels with large optical densities correspond to possible inclusions. Thus, individual pixels can readily be identified as corresponding to possible inclusions based on their optical density. Optical density thresholds can be established to differentiate among pixels associated with central pallor, possible inclusions, and normal red blood cells from training data comprising known optical density values for red blood cell image pixels identified as pallor, inclusion or normal red blood cell.

A second method for differentiating possible inclusions from central pallor and portions of normal red blood cells in pixels from red blood cell images involves two separate steps. In a first step, pixels that correspond to the central pallor are identified by examining an image of the cell corresponding to illumination with blue light (e.g., 415 nm). Pixels in the blue image are examined individually, and pixels for which the optical density both: (a) fall below a threshold value based on the average optical density in the blue image; and (b) are either further from the largest optical density in the blue image than to the average optical density in the blue image, or that differ from the minimum optical density in the blue image by less than two standard deviations, are assigned to the central pallor.

Next, pixels corresponding to possible inclusions are determined in a second step. Thus, pixels that correspond to areas of large optical density (according to a user-selectable threshold value or a threshold determined from training data comprising images of red blood cells with inclusions) in the blue image are removed from further consideration, because while refraction-related artifacts appear dark in blue images, genuine inclusions in general do not appear as dark as refraction artifacts in blue images. Then, for each of the remaining pixels, the optical densities in the yellow (Y, e.g., 598 nm), green (G, e.g., 525 nm), and blue (B) images are used to calculate a value of the quantity P:

$$P=|Y-|G-B||$$

A large value of the quantity P for a pixel effectively identifies a pixel that is dark in the yellow and green images, but light in the blue image. An image of the cell based on the values of the quantity P is constructed, and an edge detection algorithm is run on the image. For each pixel in the image, if the pixel: (a) has a large optical density value in the yellow image, Y; (b) has a large value of P; and (c) was identified as corresponding to an edge by the edge detection algorithm, then the pixel is identified as belonging to a possible inclusion.

Pixels corresponding to possible inclusions can then be grouped into inclusion fragments based on the presence or absence of pixels of other types between them. The number of inclusion fragments can be determined and used to further refine the identification of possible inclusions. For example, where a cell contains a large number of inclusion fragments (e.g., larger than a user-selectable or predetermined threshold number), the possible inclusions can be identified as being due to imaging aberrations or other phenomena such as basophilic stippling, and further analysis of possible inclusions in the cell can be discontinued.

For cells in which possible inclusions remain likely, features of the inclusions such as perimeter, area, and shape can be determined using the previously disclosed pixel-based methods. Cells featuring inclusions can then be sorted in image block 704 according to any of the various features determined for the inclusions.

Hardware and Software Implementation

The method steps and procedures described herein can be implemented in hardware or in software, or in a combination of both. In particular, electronic processor 114 can include software and/or hardware instructions to perform any of the method steps disclosed above. The methods can be implemented in computer programs using standard programming techniques following the method steps and figures disclosed herein. Program code is applied to input data to perform the functions described herein. The output information is applied to one or more output devices such as a printer, or a display device, or a web page on a computer monitor with access to a website, e.g., for remote monitoring.

Each program is preferably implemented in a high level procedural or object oriented programming language to communicate with a processor. However, the programs can be implemented in assembly or machine language, if desired. In any case, the language can be a compiled or interpreted language. Each computer program can be stored on a storage medium or device (e.g., an electronic memory) readable by the processor, for configuring and operating the processor to perform the procedures described herein.

For purposes of this disclosure, "activating" a user-selectable control displayed on an interface can include (but is not limited to) "clicking" on the control using a pointer or other indicator (e.g., a mouse pointer), positioning a pointer so that it overlays the control, highlighting the control by using a pointer or an encircling indicator, and/or positioning an indicator on the interface so that the control is selected.

Interfaces that can be used to display cell images (e.g., as user-selectable controls) include a wide variety of displays (e.g., CRTs, LED-based displays, liquid crystal-based displays, projection displays). Interfaces can be touch-sensitive, allowing a user to interact directly with the displayed elements. Alternatively, or in addition, additional system components (e.g., keyboards, pointing devices) can permit a user to manipulate elements displayed on the interface.

Figure 19:
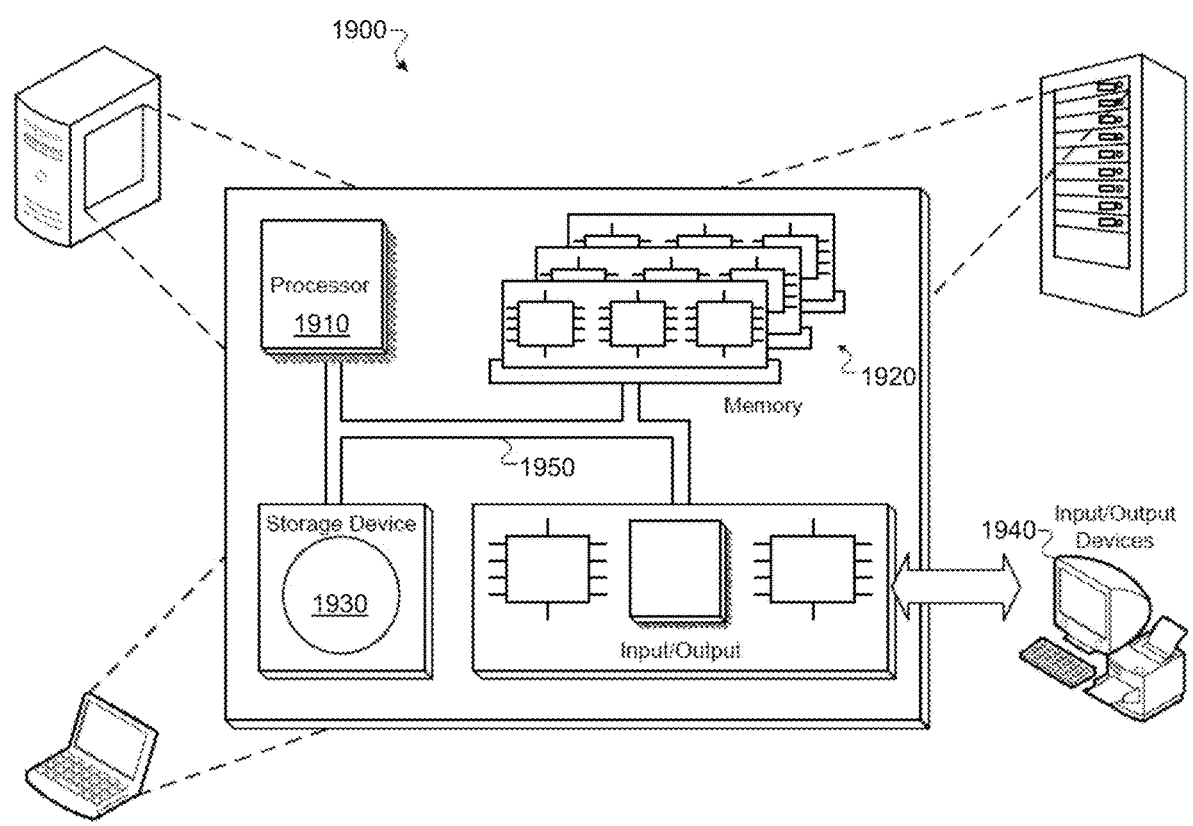
FIG. 19 is a schematic diagram of a computer system.

FIG. 19 is a schematic diagram of a computer system 1900 that can be used to control the operations described in association with any of the computer-implemented methods described herein, according to certain embodiments. The system 1900 includes a processor 1910, a memory 1920, a storage device 1930, and an input/output device 1940. Each of the components 1910, 1920, 1930, and 1940 are interconnected using a system bus 1950. The processor 1910 is capable of processing instructions for execution within the system 1900. In some embodiments, the processor 1910 is a single-threaded processor. In other embodiments, the processor 1910 is a multi-threaded processor. The processor 1910 is capable of processing instructions stored in the memory 1920 or on the storage device 1930 to display graphical information for a user interface on the input/output device 1940. The processor 1910 can be substantially similar to the processor 114 described above with reference to FIGS. 1 and 3.

The memory 1920 stores information within the system 1900. In some embodiments, the memory 1920 is a computer-readable medium. The memory 1920 can include volatile memory and/or non-volatile memory.

The storage device 1930 is capable of providing mass storage for the system 1900. In general, the storage device 1930 can include any non-transitory tangible media configured to store computer readable instructions. In one embodiment, the storage device 1930 is a computer-readable medium. In various different embodiments, the storage device 1930 may be a floppy disk device, a hard disk device, an optical disk device, or a tape device.

The input/output device 1940 provides input/output operations for the system 1900. In some embodiments, the input/output device 1940 includes a keyboard and/or pointing device. In some embodiments, the input/output device 1940 includes a display unit for displaying graphical user interfaces. In some embodiments, the input/output device 1940 includes one or more of the display 110 and interface 112 described above with reference to FIGS. 1 and 3.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described embodiments by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Various software architectures can be used for implementing the methods and systems described in this application. For example, a publish/subscribe messaging pattern can be used in implementing the methods and systems described herein. In the case of publish/subscribe messaging, the system includes several hardware and software modules that communicate only via a messaging module. Each module can be configured to perform a specific function. For example, the system can include one or more of a hardware module, a camera module, and a focus module. The hardware module can send commands to the imaging hardware implementing the fast auto-focus, which in turn triggers a camera to acquire images. In some embodiments, the hardware module can include the control system 108 described above with reference to FIG. 3.

A camera module can receive images from the camera and determine camera parameters such as shutter time or focus. Images can also be buffered in the computer's memory before being processed by the camera module. When performing the initial search for the tilt of the slide, the camera module can also send a message interrupting the hardware module when it has seen enough images to determine the proper shutter time or focus. In some embodiments, the camera module includes the detector 106 described above with reference to FIG. 3.

The system can also include a focus module that can be implemented as software, hardware or a combination of software and hardware. In some embodiments, the focus module examines all the frames in a stack and estimates how far the stack is from the ideal or ideal focal distance. The focus module can also be responsible for assigning a focus score to each frame in a stack of images.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Alternatively, the computer can have no keyboard, mouse, or monitor attached and can be controlled remotely by another computer The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 1910 carries out instructions related to a computer program. The processor 1910 can include hardware such as logic gates, adders, multipliers and counters. The processor 1910 can further include a separate arithmetic logic unit (ALU) that performs arithmetic and logical operations.

Other Embodiments

A number of embodiments have been described. Nevertheless, it will be understood that various modifications may be made without departing from the spirit and scope of the disclosure. In particular, features disclosed herein in connection with specific embodiments can generally be included in other embodiments, and particular features disclosed herein can generally be used in combination with any of the other features of any of the embodiments disclosed herein. Accordingly, other embodiments are within the scope of the following claims.

What is claimed is:

1. A method of displaying images of cells in a sample, the method comprising:
   obtaining a plurality of images of cells in the sample, wherein each image corresponds to one of the cells;
   determining values of a physical or chemical property for each of the cells;
   displaying on a display interface the images of the cells in an ordered array, wherein the images are ordered in the array according to the value of the property for the cells corresponding to the images, and wherein each image is displayed as a user-selectable control;
   displaying on the display interface a graph of a numerical distribution of values of the property for the cells and a graph of an expected distribution of the values of the property for the cells; and
   when an image is selected by a user, displaying an indicator on the graphical representation graph at a location that corresponds to the value of the property for the cell corresponding to the selected image.

2. The method of claim 1, further comprising displaying on the display interface an indicator representing a threshold value of the property for the cells.

3. The method of claim 2, further comprising displaying on the display interface two indicators representing upper and lower threshold values of the property for the cells.

4. The method of claim 3, further comprising displaying in the ordered array at least one indicator to demarcate cells for which a value of the property is between the upper and lower threshold values.

5. The method of claim 1, wherein the graphical representation graph comprises a histogram of cell counts within ranges of the numerical distribution of values of the property for the cells.

6. The method of claim 1, wherein the property comprises a cell hemoglobin content of the cells.

7. The method of claim 1, wherein the property comprises a cell volume of the cells.

8. The method of claim 1, wherein the property comprises at least one of a cell size and a cell shape of the cells.

9. The method of claim 1, further comprising determining the values of the property from the images of the cells.

10. A system for visual inspection of cells, the system comprising:
    a light source configured to illuminate a sample;
    a detector configured to obtain a plurality of images of cells in the sample;
    a display interface; and
    an electronic processor connected to the detector and the display interface, and configured to:
    determine values of a physical or chemical property for the cells;
    display the images of the cells on the display interface as user-selectable controls in an ordered array, ordering the images in the array according to the values of the property for the cells corresponding to the images;
    display on the display interface a graph of a numerical distribution of values of the property for the cells and a graph of an expected distribution of values of the property for the cells; and
    in response to a selection of an image by a user, display an indicator on the graphical representation graph at a location that corresponds to the value of the property for the cell corresponding to the selected image.

11. The system of claim 10, wherein the electronic processor is configured to display, on the display interface, an indicator representing a threshold value of the property for the cells.

12. The system of claim 11, wherein the electronic processor is configured to display, on the display interface, two indicators representing upper and lower threshold values of the property for the cells.

13. The system of claim 12, wherein the electronic processor is configured to display, on the display interface, at least one indicator in the ordered array to demarcate cells for which a value of the property is between the upper and lower threshold values.

14. The system of claim 10, wherein the graphical representation graph comprises a histogram of cell counts within ranges of the numerical distribution of values of the property for the cells.

15. The system of claim 10, wherein the property comprises a cell hemoglobin content of the cells.

16. The system of claim 10, wherein the property comprises a cell volume of the cells.

17. The system of claim 10, wherein the property comprises at least one of a cell size and a cell shape of the cells.

18. The system of claim 10, wherein the electronic processor is configured to determine the values of the property from the images of the cells.

* * * * *